（12）United States Patent
Greenspan et al.

(10) Patent No.: US 10,346,762 B2
(45) Date of Patent: Jul. 9, 2019

(54) COLLABORATIVE DATA ANALYTICS APPLICATION

(71) Applicant: CA, Inc., Islandia, NY (US)

(72) Inventors: Steven Greenspan, Islandia, NY (US); Maria Velez-Rojas, Islandia, NY (US); Jin Zhang, Islandia, NY (US); Serge Mankovskii, Islandia, NY (US); Ye Chen, Islandia, NY (US)

(73) Assignee: CA, Inc., Islandia, NY (US)

( * ) Notice: Subject to any disclaimer, the term of this patent is extended or adjusted under 35 U.S.C. 154(b) by 5 days.

(21) Appl. No.: 15/386,369

(22) Filed: Dec. 21, 2016

(65) Prior Publication Data
US 2018/0173372 A1 Jun. 21, 2018

(51) Int. Cl.
G06F 3/0481 (2013.01)
G06N 20/00 (2019.01)
G06T 11/20 (2006.01)
G06F 16/2458 (2019.01)
G06F 16/248 (2019.01)

(52) U.S. Cl.
CPC ........... *G06N 20/00* (2019.01); *G06F 16/248* (2019.01); *G06F 16/2465* (2019.01); *G06T 11/206* (2013.01); *G06T 2200/24* (2013.01)

(58) Field of Classification Search
CPC .............................. G06F 3/0481; G06Q 10/06
See application file for complete search history.

(56) References Cited

U.S. PATENT DOCUMENTS

| 5,572,644 | A | 11/1996 | Liaw et al. |
| 9,612,734 | B1 | 4/2017 | Sylvia et al. |
| 2007/0067328 | A1 | 3/2007 | Mingot et al. |
| 2010/0057646 | A1 | 3/2010 | Martin et al. |
| 2010/0275263 | A1 | 10/2010 | Bennett et al. |
| 2011/0126127 | A1* | 5/2011 | Mariotti ................ G06F 19/321 715/753 |
| 2011/0246925 | A1 | 10/2011 | Marchand et al. |
| 2012/0042279 | A1 | 2/2012 | Naderi |
| 2012/0179513 | A1 | 7/2012 | Siklos et al. |

(Continued)

OTHER PUBLICATIONS

AutoVis: Automatic visualization, Information Visualization vol. 9, 1, Mar. 2010, pp. 47-69.

(Continued)

*Primary Examiner* — Haoshian Shih
(74) *Attorney, Agent, or Firm* — Pillsbury Winthrop Shaw Pittman LLP

(57) ABSTRACT

Provided is a process of conducting a collaborative session between two analytics graphical user interfaces (GUI), the process including: instructing a first computing device associated with a first user to display a first GUI having a first graph depicting a first set of values of a first metric; determining that the first graph is to be shared on a second computing device associated with a second user in a second GUI; inferring that the second user prefers to view the first metric in a second graph based on a record of previous interactions in which the second graph was selected to view the first metric; and in response, instructing the second computing device to display in the second GUI the second graph depicting at least some of the first set of values of the first metric.

25 Claims, 10 Drawing Sheets

(56) References Cited

U.S. PATENT DOCUMENTS

| | | | |
|---|---|---|---|
| 2013/0012242 A1* | 1/2013 | Nag | H04W 4/185 455/457 |
| 2013/0013630 A1 | 1/2013 | Yemparala et al. | |
| 2013/0085961 A1* | 4/2013 | Naghshin | G06Q 10/06 705/348 |
| 2013/0125057 A1* | 5/2013 | Kashik | G06F 3/04815 715/852 |
| 2014/0067407 A1 | 3/2014 | Sathe et al. | |
| 2014/0222588 A1 | 8/2014 | Ozaki | |
| 2014/0270494 A1 | 9/2014 | Sawhney et al. | |
| 2014/0324867 A1 | 10/2014 | Tee et al. | |
| 2014/0358828 A1 | 12/2014 | Phillipps et al. | |
| 2015/0199114 A1 | 7/2015 | Louch et al. | |
| 2015/0339446 A1 | 11/2015 | Sperling et al. | |
| 2016/0070434 A1 | 3/2016 | Clark et al. | |
| 2016/0103592 A1 | 4/2016 | Prophete et al. | |
| 2016/0110076 A1 | 4/2016 | Reeves et al. | |
| 2016/0246490 A1 | 8/2016 | Cabral | |
| 2016/0292065 A1 | 10/2016 | Thangamani et al. | |
| 2016/0359993 A1 | 12/2016 | Hendrickson et al. | |
| 2016/0366036 A1 | 12/2016 | Gupta et al. | |
| 2018/0101295 A1 | 4/2018 | Casey | |

OTHER PUBLICATIONS

Data visualization, Wikipedia, https://en.wikipedia.org/wiki/Data_visualization, Sep. 14, 2016, pp. 1 to 15.

Feature (machine learning), Wikipedia, https://en.wikipedia.org/wiki/Feature_(machine_learning), Jan. 31, 2016, pp. 1 to 2.

A Comparative Evaluation of Unsupervised Anomaly Detection Algorithms for Multivariate Data, PLOS One | DOI:10.1371/journal.pone.0152173, Apr. 19, 2016, pp. 1 to 31.

Non-Final Office Action as issued in U.S. Appl. No. 15/386,354, dated Nov. 5, 2018.

\* cited by examiner

COLLABORATIVE DATA ANALYTICS APPLICATION

BACKGROUND

1. Field

The present disclosure relates generally to computer systems and, more specifically, to predictive graph selection.

2. Description of the Related Art

Data analytics applications are used in a variety of contexts. Often, users encounter large sets of data (e.g., more than 500 kilobytes of data) or high dimensional data (e.g., with more than 5 dimensions). Such data sets can be difficult for users to process by simply reading the data line-by-line. Useful information in the data may reside in relationships between fields of data, and noteworthy data values may only appear noteworthy when viewed in the proper context. Data analytics applications help users extract knowledge from data by providing graphical representations of the data, e.g., in trend lines, histograms, bar charts, pie-graphs, area charts, Veroni diagrams, tree charts, force directed graphs, heat maps, three-dimensional surface plots, topographical maps, and various other graphs. Such graphical representations often lower the cognitive load on the user and make it possible to investigate the data in ways that would be infeasible with a manual approach.

SUMMARY

The following is a non-exhaustive listing of some aspects of the present techniques. These and other aspects are described in the following disclosure.

Some aspects include a process of conducting a collaborative session between two analytics graphical user interfaces (GUI) presented on two different computing devices, the process including: instructing a first computing device associated with a first user to display a first GUI having a first graph depicting a first set of values of a first metric; determining that the first graph is to be shared on a second computing device associated with a second user in a second GUI; inferring that the second user prefers to view the first metric in a second graph, different from the first graph, based on a record of previous interactions in which the second graph was selected to view the first metric; and in response to the inference and the determination, instructing the second computing device to display in the second GUI the second graph depicting at least some of the first set of values of the first metric.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
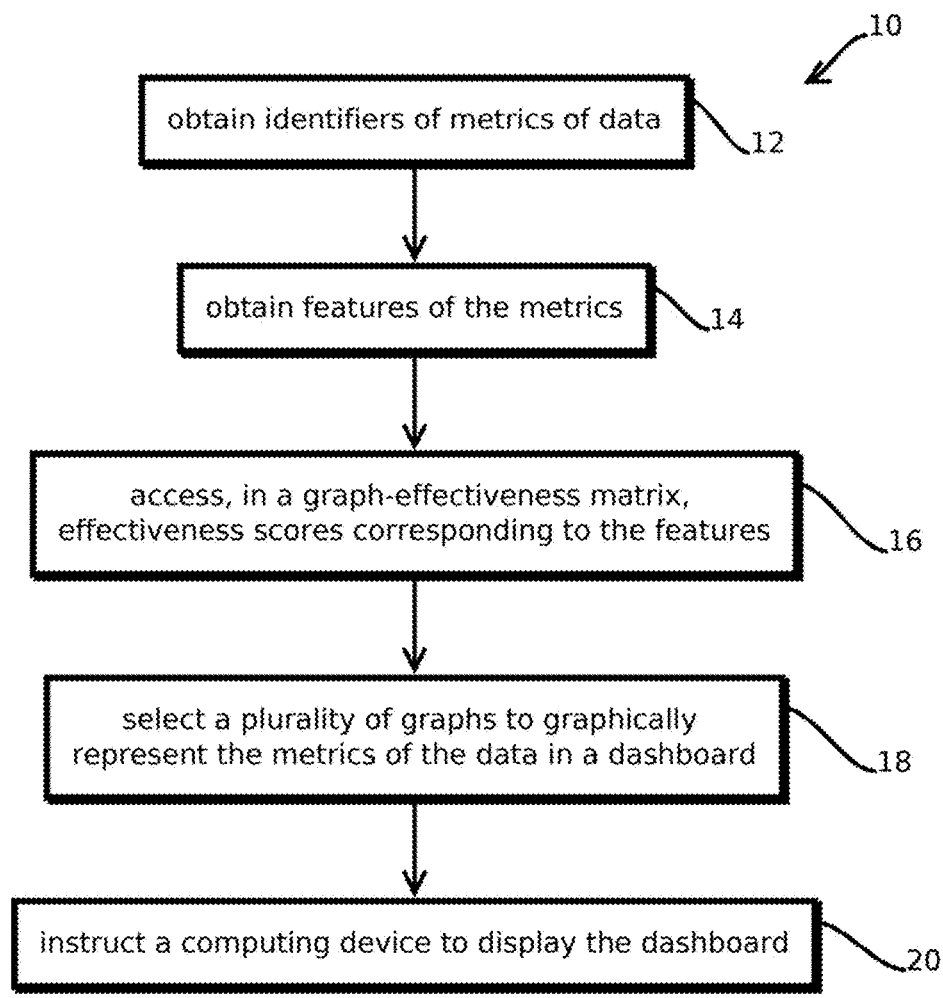
FIG. 1 is a flow chart of an example process to predictively select a graph for a dashboard in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of data analytics and distributed computing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1 is a flow chart showing an example of a process 10 that may mitigate some issues with traditional analytics-related features in software applications. Many analytics applications (e.g., information technology (IT) infrastructure analytics applications) operate over complex, dynamic virtual and cloud environments to analyze (often vast amounts of) data, e.g., arising across IT infrastructure. In some use cases, the goal of these data analytics processes is to help users optimize performance, detect anomalies and in general understand the behavior across IT infrastructure. Appropriate visualization of the results from the analytics system is often helpful to provide analysis support, insight and understanding of diverse and time varying data. Traditionally, dashboard design entails manual configuration and provide a relatively limited number of available visual representations. The disparity between the diversity and complexity of the data analytics and the limited visual representation makes it difficult for users to interpret the results. Further, existing analytics applications often place sensitive data on more computing devices, expanding a networks attack surface, and in many cases, traditional analytics applications are not well suited to collaboration between team members seeking to bring different expertise to a project.

Some embodiments mitigate these (and other) issues. Some embodiments automatically generate dashboards for analytics driven applications. Some embodiments select graphs for the dashboards with machine learning models. In some embodiments, the models are trained to select graphs based on features and patterns found in the data being analyzed, heuristics from user preferences and role requirements, as well as behavior patterns exhibited during task performance. Some embodiments may select relatively efficient visual representations for dashboard content based on data features, user preferences, social-network-based recommendations, or expert behavior analysis, which is expected to assist users extracting insights from the data. Some embodiments automatically generate dashboards according to characteristics of the data sources (e.g., with a data driven approach described below), user preferences, roles and task heuristics (e.g., with a user-driven approach described below), and problem-solving strategies (e.g., with a behavior driven approach described below). Such embodiments are best understood in view of example embodiments like those shown in the figures.

In some embodiments, FIG. 1's process 10 may be performed by one or more of the computers described below with reference to FIG. 10, for example, serving as components of the system described below with reference to FIG. 4 in order to produce dashboards like those shown in FIG. 3. In some embodiments, the process 10 may draw upon machine learning models trained with the processes described below with reference to FIG. 2. In some cases, predictive graph selection may be implemented in collaborative graph-sharing sessions across computers that mitigate issues with traditional collaboration software, e.g., as described below with reference to FIGS. 5-9.

The process 10, and the various other processes and functionality described herein, may be implemented as programs encoding instructions stored on a tangible, non-transitory, machine-readable medium, such that when the instructions are read and executed by one or more processors, the functionality described is effectuated. The instructions need not be resident on a single instance of memory, and different subsets of the instructions may be executed by different processors accessing different media (and reference to "a medium" includes a plurality of media each storing a subset of the instructions). In some cases, instructions may be executed in multiple instances, concurrently, and some of the instructions described sequentially may be executed either sequentially or concurrently, which is not to suggest that any other feature is limited to the examples described to illustrate a broader concept.

In some embodiments, the process 10 may be initiated as a batch process, for instance scheduled to run hourly or daily in order to prepare dashboards in advance of a user request, so that user requests may be serviced relatively quickly. Or some embodiments may execute the process 10 in response to a user request for a dashboard, for instance, received over a network, like with the system described below with reference to FIG. 4, in order to generate dashboards based on the most current information available.

In some embodiments, the process 10 may include obtaining identifiers of metrics of data, as indicated by block 12. The data may be any of a wide variety of different types of data from various sources. In some embodiments, the data includes server logs for a web application, which tend to be relatively voluminous, high dimensional, and difficult for users to analyze absent assistance identifying the appropriate graphical visualizations. But a wide variety of other types of data present similar issues. Examples include data from sensors monitoring a manufacturing line, data from sensors on machinery, data from marketing campaigns, healthcare related data, and the like. In some embodiments, the data may be relatively voluminous, for example exceeding, 1 Mb, and in many cases exceeding 10, 100, 500 Mb, 1 Gb, or 1 Tb. In many cases, the data is expected to be relatively high dimensional, for example, including more than 20 fields of information for more than 1 million records.

The terms "metric" and "data" are used in different senses. Metrics are based on, but are distinct from the data. In some cases, the metrics are correlations in the data, like coordinate pairs of timestamps and a value of a field in the data corresponding to the timestamp. In some cases, the metrics are higher dimensional coordinates, like a timestamp, an Internet Protocol (IP) address, and a geolocation of the IP address. In some cases, the metrics are aggregations of the data, for example, an average of values of fields of the data over a trailing duration, or counts of values of fields in the data within various ranges, like in bins used to constitute a histogram, or counts of fields having values geolocated in larger geographic areas, like by ZIP Code or state. In some cases, the metrics are values of individual fields of the data, but the notion of a metric is broader than that of the data and includes various measurements based on the data. In some cases, identifiers of multiple metrics may be obtained based on the same data, for instance multiple, different ways of aggregating the data, like rankings, timeseries, groupings by geolocation, and various permutations of coordinate pairs based on values of fields of the data.

The identifiers of the metrics may uniquely identify and distinguish the metrics from one another, but in some embodiments do not include values that the various metrics take. For example, the identifier "social network shares by ZIP Code" identifies a metric, but is distinct from values that that metric might take, for example, coordinate pairs like ZIP Code 78701 and 1572 social shares, and ZIP Code 78703 and 287 social shares. Thus, obtaining identifiers of metrics does not necessarily require that the data or the values taken by those metrics be obtained, though embodiments are also consistent with obtaining this information as well. Some embodiments may maintain separation of the values of the metrics (and the underlying data) from metadata (like the identifiers) by which the dashboard is generated, so that security of the underlying data and metrics may be maintained across different entities and computing environments. That said, not all embodiments provide this benefit, as various independently useful techniques are described, and some embodiments may consolidate this information within a single system to simplify system architecture, none of which is to suggest that any other feature described herein is not also amenable to variation.

In many cases, a given set of data could give rise to a relatively large number of different metrics, e.g., as many different combinations of fields of information as are available, along with various aggregations, like by trailing duration or geographic region. In some cases, the identified metrics may be a subset of this universe, selected with a variety of different techniques. In some cases, users may configure the process 10 (by entering the configuration into the interface described below with reference to FIGS. 3 and 4, which may store and recall these settings) to identify a specified set of metrics based on the type of data, the source of data, the amount of data, the users task, the user's role, or the like. Embodiments may access a record documenting such a configuration and obtain identifiers from that corresponding record.

Some embodiments may programmatically infer the identifiers obtained in step 12. For example, some embodiments may execute unsupervised machine learning routines to identify a set of metrics inferred to be potentially of interest to the user. To this end, some embodiments may execute an anomaly detection algorithm that compares candidate metrics of the data to statistical distributions of the candidate metrics on previous instances of the data and rank the candidate metrics according to a probability of the current candidate metrics reflecting a real change in the population rather than random fluctuation. Those candidate metrics reflecting the largest changes relative to the distributions based on historical data may be selected, for instance, a threshold number of candidate metrics. Some embodiments may execute various clustering algorithms on the data, like DBSCAN, and determine whether the current data yields different clusters from those seem previously. In some cases, new clusters may be paired with clusters yielded by other instances of the data that are closest in space to the new clusters, and the dimensions in that space that account for the largest distances between those pairs of clusters may be selected as candidate metrics. Various examples of unsupervised anomaly detection are described in Goldstein M, Uchida S (2016) *A Comparative Evaluation of Unsupervised Anomaly Detection Algorithms for Multivariate Data*, PLoS ONE 11(4): e0152173. doi: 10.1371/journal. pone. 0152173, the contents of which are hereby incorporated by reference. In some embodiments, the number of metrics may be relatively large, for example, between 5 and 50 in many commercially relevant use cases.

Next, some embodiments may obtain features of the metrics, as indicated by block 14. The features are properties of the metrics and are distinct from identifiers of the metrics and values of the metrics (which is not to suggest that a feature may not arise from a value or that an identifier may not indicate features). In some cases, multiple metrics may have the same features, and many metrics may have multiple features. Examples of features of metrics include an amount of dimensions in coordinates or other vectors (like whether a metric is bivariate or trivariate), the metric representing an aggregation of data (like the metric being a moving average or a count of instances of the data within some range, like within a time range or within a geographic area), the metric having a geographic dimension, the metric having a temporal dimension, the metric describing nodes or edges of a mathematical graph. (The term "mathematical graph" is used to distinguish the term "graph" from that of a visual graphical representation of data. Unless indicated otherwise, the term "graph" refers to the latter.) In some embodiments, the obtained identifiers may be obtained along with metadata explicitly listing the features of the identified metrics, or in the example above in which the metrics are selected among candidate metrics, the candidate metrics may be hand labeled as having various features. Some features may be inferred from units or dimensions of the metrics, and some features are themselves units or amounts of dimensions of the metrics. Some embodiments may maintain in memory (e.g., of the client or one of the servers described with reference to FIG. 4) a data repository of metrics associated with a data source and features associated with each of those metrics. Embodiments may obtain the metrics from this data repository.

Some embodiments may obtain features of values of the metrics, as indicated by block 15. Again, the features of values of the metrics are distinct from the values themselves, but are based on the values. And the features of values are distinct from identifiers of the values. The features of the values are properties that arise from relationships between the values taken by a given metric. In some embodiments, a machine learning system identifies features of interest for all data sources and rank them according to their importance. Examples of such features include correlation between variables, time-dependent events, behavior patterns and anomalies. An example of a feature of the values include a given metric having values that are outliers relative to historical data, having values that cluster, having values that cluster in a mathematical graph having certain properties (e.g., like within a cluster having less than a threshold average number of edges connecting every node in the cluster to every other node), and the like. The features of values of the metrics are distinct from features of the metrics, in part, in because a feature of a metric is present regardless of the values taken by the metric, while a given metric may have some features of the values in some cases, but not others, depending upon the relationships between the values of the metric. In some cases, some values of different metrics may have the same feature, and a given set of values for a given metric may have multiple features.

Next, some embodiments may access, in a graph-effectiveness matrix, effectiveness scores corresponding to the features (e.g., the features of the metrics, or the features of the values of the metrics), as indicated by block 16. This step may be performed client side or server side in the environment described below with reference to FIG. 4. In some embodiments, the graph-effectiveness matrix may be formed and updated with the techniques described below with reference to FIG. 2. The graph-effectiveness matrix reflects graph effectiveness over a plurality of dimensions. In some embodiments, the features are matched against a visualization catalog of graphs with the matrix, and the graphs are assigned an effectiveness score that reflects how well the graph matches the features, in some cases, with the features being weighted according to how anomalous the feature are or based on user-assigned weights for features deemed more important. Examples of features of interest include qualitative vs quantitative data, time sequences, raw data vs. summaries (e.g., Average, sums, percentages). The dashboard is created by adding the most effective visualization for each important feature.

One dimension may be a graph dimension, which may be a list of nominal values corresponding to various graphs (e.g., graphical representations that map visual attributes, like color, shape, and location, of a region of a display to values of metrics) that are candidate graphs among which selections are to be made for a dashboard. Examples of graphs include bar graphs, pie graphs, Voroni diagrams, spark lines, trend charts, stacked flow diagrams, topographical maps, three dimensional graphs, animated moving three dimensional surfaces, heat maps, force directed graphs, and the like. In some embodiments, it is expected that the number of graphs along the graph dimension of the graph-effectiveness matrix will be relatively large, for example, numbering greater than 50, and in many cases more than 200 different graphs. In some embodiments, each graph may be associated in memory with a respective graph template component (e.g., instructions for a canvas element or user interface graphical object), which may be retrieved from memory and inserted in a template when a graph is chose to instruct a rendering device how to display the graph.

Another dimension of the graph-effectiveness matrix may include a feature dimension having nominal values corresponding to different features that the metrics and values of the metrics may take. In some cases, the features obtained in operations 14 and 15 may be a subset of the features among the feature dimension, as the feature dimension may account for features present in other metrics that were unselected, and features present in other values of other metrics, thereby allowing the graph-effectiveness matrix to generalize across relatively diverse inputs. In some cases, the number of features in the feature dimension may be larger than 20 features, for example, larger than 200 different features. In some embodiments, the graph-effectiveness matrix may include two feature dimensions, one for the features of the metrics obtained in operation 14, and one for the features of the values of the metrics obtained in operation 15. In some embodiments, these different features may be on the same dimension, and in some embodiments, values of that feature dimension may be populated with each pairwise combination of a feature of a metric and a feature of values of a metric.

In some embodiments, the graph-effectiveness matrix may include additional dimensions by which the values therein are further customized according to the role a user plays in an organization for which the dashboard is being generated, a task the person is undertaking in that role, and an individual person performing that task in that role who has previously either explicitly or implicitly provided feedback indicating preferences regarding dashboard selections. Some embodiments may include dimensions for higher order interactions between the above-described dimensions, like dimensions for pairwise interactions between each member of the set of features along the feature dimension. Some embodiments may include interaction dimensions for relatively high order interactions, for example three, four, or five order interactions, in some embodiments. Examples are described below with reference to FIG. 7.

In some embodiments, each of these dimensions of the graph-effectiveness matrix may index values of the graph-effectiveness matrix that indicate effectiveness of the corresponding graph for metrics having the corresponding features and metric values having the corresponding features, in some cases for users having the corresponding role, performing the corresponding task, for the corresponding person (or pair of persons or other combination of persons). In some embodiments, the effectiveness scores serving as values may be relative measures of graph effectiveness based on information reported by users, for example, expert users providing a training set, for example, effectiveness scores may be values from 0 to 10, with 10 indicating that a corresponding graph is relatively effective, and thus well-suited, for metrics having the corresponding feature and metric values having the corresponding feature. In some cases, the effectiveness scores are ratings provided by humans or are inferred with computational techniques described below. In some embodiments, the effectiveness scores are aggregated from multiple sources and are updated in accordance with the techniques described below with reference to FIG. 2. Effectiveness scoring does not require that a human's internal mental state be accurately reflected. Effectiveness scoring may include aggregating available data indicative of such a state.

A data structure need not be labeled as a "matrix" in code to serve as a graph-effectiveness matrix. Matrices may be encoded in a variety of different data structures, including as hierarchical arrangements of objects in an object-oriented programming environment, as nested arrangements of dictionaries and lists, and in flat files or lookup tables indexing coordinates of dimensions to effectiveness scores. In some cases, the graph-effectiveness matrix may be encoded in various machine learning models, either implicitly or explicitly, like in weights of a neural net, or parameters of a classification tree (e.g., in machine learning models taking as inputs features of the metrics and outputting a classification score for each candidate graph). In each case, a corresponding set of the above-described dimensions of the graph-effectiveness matrix may be mapped to a corresponding effectiveness score. In some cases, the scores are binary, or some embodiments may include higher granularity scores.

Next, some embodiments may select a plurality of graphs to graphically represent the metrics of the data in a dashboard, as indicated by block 18. In some embodiments, the selection may be performed client side or server side. Some embodiments may select four, five, six, eight, sixteen, or more graphs to populate the dashboard. In some embodiments, the graphs of the graph dimension of the graph-effectiveness matrix may serve as candidate graphs, and those candidate graphs may be ranked according to the accessed effectiveness scores, with the highest ranking graphs being selected. Some embodiments may select those graphs above a threshold rank, and some embodiments may select those graphs having effectiveness scores above a threshold. In some cases, the number, and in some cases type, of the graphs may be selected based on content negotiation with a computing device on which the graph is to be displayed. In some cases, the computing device may request the dashboard over a network, and the request may include a user agent string that indicates attributes of a display screen of the computing device, like a size of the display screen or whether the display is that of a mobile computing device, and some embodiments may select a smaller number of graphs in response to the request indicating a smaller display screen.

As noted above, in some cases, some metrics and values of metrics may have multiple features, which may result in operation 16 accessing multiple effectiveness scores for those respective metrics. A variety of techniques may be performed to aggregate those multiple effectiveness scores to determine an aggregate effectiveness score for each candidate graph. Some embodiments may average the effectiveness scores for the plurality of features (or determine some other measure of central tendency, like mode, or median). Some embodiments may determine a weighted average of the plurality of features. Some embodiments may access in memory a repository of key-value pairs that maps each feature to a weight, for instance, a value of between zero and one, that indicates an influence of that respective feature on the weighted average. In some cases, the weights may be normalized to sum to one before applying the normalized weights to the corresponding effectiveness scores to calculate an aggregate effectiveness score for a metric having multiple features. In some embodiments, the weights may be adjusted based on weightings supplied by expert users or based on feedback from users on selections based on current weightings. Some embodiments may adjust these weights independent of the process described below with reference to FIG. 2, or some embodiments may adjust these weights concurrent with that process to reduce an aggregate amount of error produced by chosen weights and effectiveness scores based on a training set or to increase an aggregate amount of fitness relative to the training set.

Next, some embodiments may instruct a computing device to display the dashboard, as indicated by block 20. In some cases, this operation may include sending webpage content, like hypertext markup language (HTML), JavaScript™, cascading style sheets (CSS), and the like, to a web browser of a client computing device in which the dashboard is to be displayed. In some embodiments, a template of the dashboard is formed and sent to the client computing device to instruct the computing device to display the dashboard. In some embodiments, the template identifies the metrics to be shown in the selected graphs and subsets of available values of metrics (e.g., ranges) to be shown. In some embodiments, the template does not include the values of the metrics or the data upon which the metrics are based, and this information, as needed by the rendering computing device (e.g., the user's web browser), may be retrieved from a different entity, such as from a server on a different domain from that of a computer system performing the process 10. Examples of such an arrangement are described below with reference to FIG. 4. In some embodiments, a special purpose application executing on the client device (e.g., a non-web browsing application) may display the dashboard.

Separating the templates from the data shown within the dashboards described by the templates is expected to help keep that data secure. Such separation is expected to reduce the number of systems having that data resident in memory, thereby reducing the attack surface of the application relative to systems that distribute the data more liberally. That said, not all embodiments afford this benefit, as some embodiments may consolidate this information in a single computer system on a single domain, for instance to simplify engineering of application architecture or lower latency. In some embodiments, the instruction may be an explicit command, or in some cases, the instruction takes the form of markup or other data that causes the receiving device to display the dashboard. In some embodiments, the instruction is sent from a remote server to a rendering client device, or in some cases, the instruction is generated internally by the displaying device, e.g., by a special purpose application accessing resources of the operating system to effectuate display of the dashboard.

In some embodiments, the template may be configured to periodically request updates of the values of metrics shown in the dashboard, like every minute. Or some embodiments may be configured with an event handler that receives events indicating a change in the values, and the event handler may respond to such an event by requesting the new data and updating the display to reflect the new data.

Figure 2:
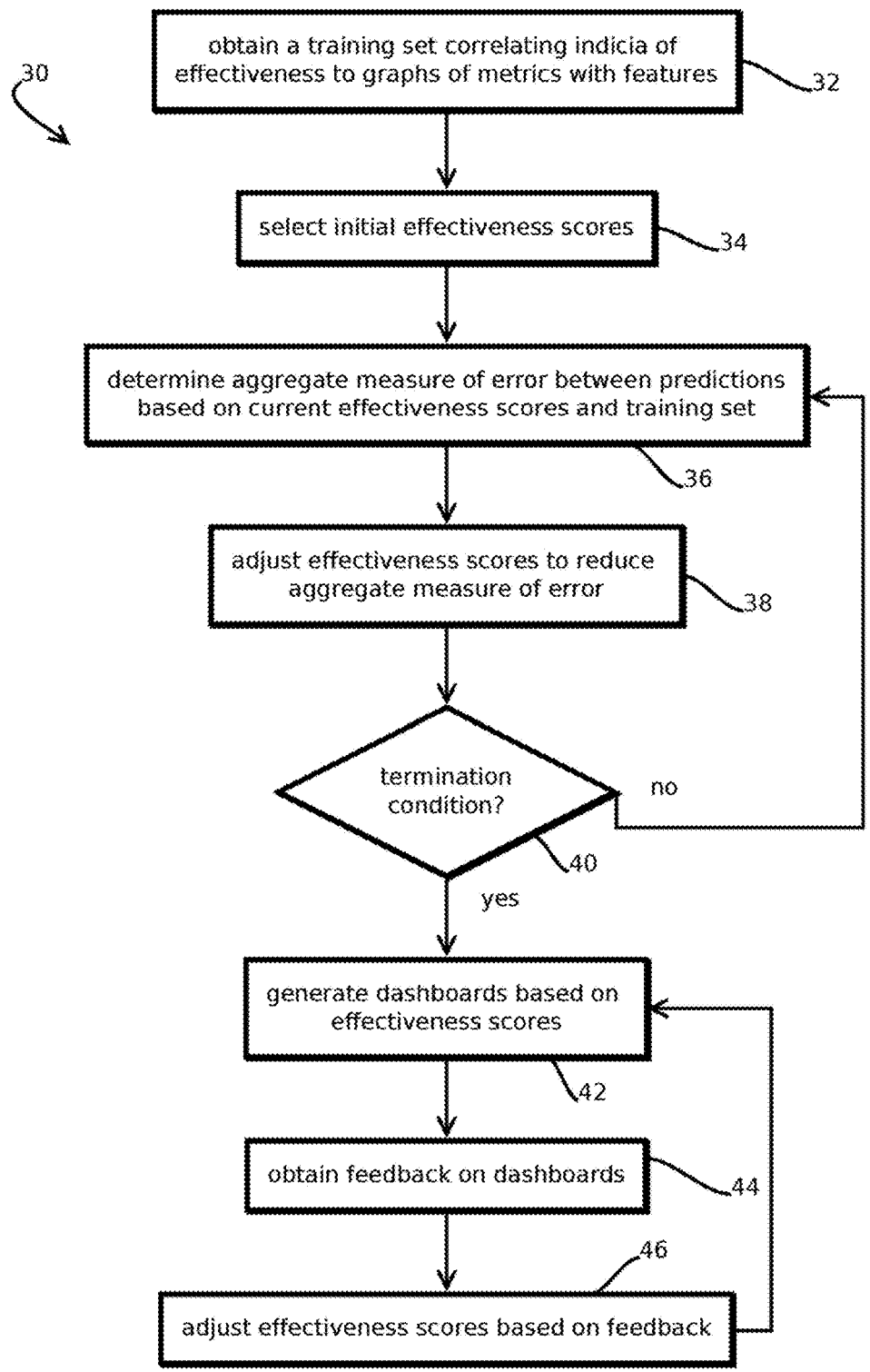
FIG. 2 is a flow chart of an example process to train a model for graph selection in accordance with some embodiments.

FIG. 2 is a flow chart of an example of a process to form and update the above-described graph-effectiveness matrix. The illustrated process 30, in some embodiments, may form and update the matrix with a data-driven approach, a user-driven approach, or (i.e., and/or) a behavior-driven approach, each of which are described below. In some embodiments, the process 30 may be performed as a batch process, for example periodically, like weekly or monthly, to update the graph-effectiveness matrix. In some cases, the graph-effectiveness matrix may be updated and formed with supervise machine learning techniques based on the various examples of training sets described below, using the various examples of supervise machine learning models described below. In some embodiments, the process 30 is performed server-side, by a computing system hosting an analytics application in the form of a software-as-a-service application, or in some cases, the process 30 may be performed by a special purpose application executing on a user's device or distributed among a plurality of such devices (e.g., with different segments of the matrix being processed by different user devices in a concurrent, distributed training application).

In some embodiments, a data-driven approach of forming or updating the matrix first extracts features of visualizations (or other graphs) from the catalog of graphs and data features from all the data sources. Graphs may be classified depending on the characteristics of the data the graphs can show (e.g., discrete, continuous, ordinal, geographic, time dependent, etc.), the graph's scalability to large data volumes, and other specific aspects, such emphasis on correlations and clusters. In some embodiments, computer vision algorithms analyze and score screenshots of the visualizations available in the catalog of graphs and to extract relevant properties from which scores may be determined.

Some embodiments may form and update the graph-effectiveness matrix, e.g., at least in part, with a user-driven approach that uses heuristics (e.g., pre-defined heuristics) related to user roles and tasks. Heuristics may be stored in memory as a set of rules and derived from organizational guidelines. A rules engine may retrieve the rules and iterate through the rules to determine scores. For instance, roles may limit the data details that an operator can view. Also, there might be tasks that require users to see a particular view of the data to meet quality assurance needs.

In some embodiments, the system processes new users by creating dashboards based on organizational heuristics and then learning over time from user preferences and feedback. In some embodiments, the system learns over time based on individual preferences and allows users to share those preferences in a social media setting by maintaining a graph of user accounts in memory and passing messages between user account nodes of the graph with the shared content. Some embodiments may receive a user request to share their dashboard template or to add annotations based on the type of tasks for which the template is useful, and those requests may be logged for subsequent training of the system. Some embodiments may receive user requests to search for templates based on task, role and expertise of the template owner, identify responsive templates, and receive and add reviews to a record of a responsive template if the template is found to be useful, as indicated by received user feedback (e.g., comments, ratings, or usage). In some cases, tasks may be predefined by the organization via an administrative or account-configuration user interface, and these configuration settings may be stored in memory and accessed when training and configuring dashboards. In some cases, users may request a dashboard for a very specific and previously undefined tasks. Some embodiments may receive the request in the form of natural language supplied by the user describing the task and translate the natural language into a series of data features, descriptive statistics and other factors that are used as input for data driven approach. For example, the natural language may be processed with a word-to-vector algorithm, other vectors within a threshold distance in vector space may be identified, and tasks or graphs associated with those other vectors may be selected.

Some embodiments may implement a behavior-driven approach that improves the graph based on logged usage while users engage in complex problem-solving processes. Users may initially be shown a default template selected by the system, but if an anomaly or an outlier is detected by the user, users may input a request to change to a different graph that will provide more details or it will allow the user to bring relevant context to the data. Some embodiments log these user inputs and the state of the system when the input was entered, and these logs may be used as a training set to learn from user behavior. Examples of such inputs include records from eye tracking technology to detect the most used visualization, the sequence in which graphs are seen, user navigation between graphs, user interaction with graphs, and the like. Based on trained models, some embodiments may infer details about the user's problem solving process and take predictive action in the future. This information may be later used to select the position in the screen where the most viewed visualizations should be placed. For instance, the most important visualizations (as indicated by behavior data) may be located on the top-sight area of the screen. Some embodiments may also use behavior data to provide problem solving tips for the users using the dashboards templates, as described below with reference to FIG. 7. Tips may appear as text and notes and highlighted information within visualizations or suggested resources for a workflow. In some cases, such tips may be inferred by training a hidden Markov model or recurrent neural network on logged sequences of states of the dashboard, with tips corresponding to a predicted next state of the dashboard predicted by a trained model based on a previous sequence of states in a current session.

In some embodiments, the process 30 includes obtaining a training set correlating indicia of effectiveness to graphs of metrics with features, as indicated by block 32. In some embodiments, the training set may be an initial training set by which the graph-effectiveness matrix is to be formed. Some embodiments may obtain a training set by presenting to expert users each permutation of graph and feature pair with a plurality of different sets of sample metric values and receiving from the expert users respective effectiveness scores. In some cases, each rating may include an identifier of the graph, identifiers of the features and metrics at issue, and the expert's rating. Some embodiments may obtain a relatively large number of such records, for example more than 5,000, provided by several experts to generalize the model. In some cases, the number of graphs and features may be too large for experts to adequately populate a training set, and some embodiments may implement other techniques to obtain the training set, for example, based on computer vision analysis of graphs based on metrics with the features.

For example, some embodiments may generate image files of graphs for each permutation of graph and feature and sample set of metric values. Some embodiments may input the resulting image file to a computer vision algorithm configured to output a score indicative of the inferred effectiveness of the graph. In some cases, the computer vision algorithm may be trained, for example, with back propagation of a convolution neural net, to score image files as having properties associated with effective graphs. In some cases, the computer vision algorithm may be trained with a separate training set having images of graphs that experts have classified or scored as according to effectiveness. The set may include both positive and negative examples. For example, such an algorithm may detect that data is relatively clustered in a single location and that a relatively large proportion of the image of the graph is white space, indicating that the graph does not appropriately take advantage of the available space to inform the view viewer of about relationships within the data. In another example, some embodiments may determine that an image contains relatively few colors or shapes, indicating that a relatively small range of variation or information is displayed to the user. Based on features of the image, some embodiments of the trained computer vision algorithm may output an effectiveness score. In some cases, a subset of the training set may be reserved to cross validate the trained computer vision algorithm.

In some embodiments, the training set for the graph-effectiveness matrix (as opposed to the training set for the computer vision model, which may include some of the same data and may train an algorithm configured to output part of this training set) includes expert selections (e.g., ratings) of graphs among the candidate graphs associated with the features of the metrics and values of the metrics present when the selection was made. For example, in some embodiments, experts may select (or otherwise rate) several thousand graphs for several thousand different metrics based on different data sets, and the training set may indicate for each selection, the features of the metrics and values of the metrics present.

In some embodiments, the effectiveness scores may be determined by training a model to replicate the selections of the experts based on the features. The training set may be used to determine the effectiveness scores in the graph-effectiveness matrix with a variety of different techniques. In some embodiments, a plurality of expert-supplied or algorithmically supplied scores may be averaged (or aggregated with some other measure of central tendency) among each member of the training set that corresponds to that value in the graph-effectiveness matrix, e.g., at a given position specified by the dimensions of the graph effectiveness matrix. For example, if three experts supplies six scores for a given graph presenting metrics with a given set of features, then those six scores may be averaged to determine the effectiveness score in the matrix. Or some embodiments may implement machine learning techniques to generalize, for instance by parameters of the machine learning model, in some cases with a stochastic gradient descent.

In some embodiments, if the training set is large enough, the model may generalize to combinations of features that were not among the training set and yield acceptable selections. In some examples, the effectiveness scores may be weights in a neural net that translates a given set of features (and the other matrix dimensions) to a selection of the graph. In some embodiments the effectiveness scores are parameters of a classification tree learning model (e.g., a CART model) configured to select graphs based on features of metrics and metric values (and the other matrix dimensions).

To determine model parameters, some embodiments include selecting initial effectiveness scores, as indicated by block 34. In some cases, the initial effectiveness scores may be selected arbitrarily, for example, as pseudorandom values.

Next, some embodiments may determine an aggregate measure of error between predictions based on current effectiveness scores (serving as, or implicit in, model parameters) and the training set, as indicated by block 36. Some embodiments may input features of metrics and values of metrics within the training set and output predicted effectiveness scores from the model, for example, from the graph-effectiveness matrix. Some embodiments may then determine a difference between those output effectiveness scores and the score indicated by the training set for the same inputs. Some embodiments may aggregate these differences, for example as a sum of absolute values of these differences.

Next, some embodiments may adjust the effectiveness scores to reduce the aggregate measure of error, as indicated by block 38. In some cases, this may include adjusting the parameters of the model, such as values of the graph effectiveness matrix, in a direction that the calculated rates of change in different directions indicate will lead to a reduced aggregate error. Some embodiments may determine rates of change of the aggregate error as a function of changes in each of the values of the model in different directions, such as values of the matrix, for instance in a gradient descent training algorithm. Or some embodiments may recursively select division planes in the feature space (or matrix dimension space), e.g., in a classification tree training algorithm, based on the aggregate measures of error or fitness, for instance with a greedy selection at a given instance of recursion that minimizes error or maximizes fitness.

Next, some embodiments may determine whether a termination condition has occurred, for example as indicated by block 40. In some cases, this determination may include determining whether a change in the parameters of the model, for instance, a total change in absolute values of effectiveness scores in the matrix, is less than a threshold, indicating a local or global minimum. In another example, some embodiments may determine whether more than a threshold amount of iteration is have occurred.

Upon determining the termination condition has not occurred, some embodiments may return to block 36 and execute another iteration of blocks 36, 38, and 40 (e.g., another iteration of a gradient descent or another recursive division of the feature space). In some embodiments, repeated iterations are expected to drive the parameters of the model to a state that produces a relatively low aggregate error (or has a relatively high fitness) relative to the training set. In some embodiments, the process including operations 34 through 40 may be repeated multiple times with different initial effectiveness scores, and the repetition that produces the lowest aggregate measure of error (or highest fitness) relative to the training set may be selected as the one with the model parameters to be used. Varying initial conditions may reduce the likelihood of reaching a local rather than global optimum. In some embodiments, a portion of the training set may be withheld, and the resulting model may be cross validated against the reserved portions of the training set to determine whether the model appropriately generalizes. Some embodiments may again calculate an aggregate measure of error relative to each withheld portion of the training set and determine whether that withheld data has an aggregate measures of error less than a threshold. Some embodiments may implement the above techniques with reversed signs and instead determine an aggregate measure of fitness. Such embodiments may adjust model parameters in a direction that increases the aggregate measure of fitness, rather than in a direction that decreases the aggregate measure, like in the example using an aggregate measure of error.

Next, some embodiments may generate dashboards based on the effectiveness scores, as indicated by block 42. In some cases, this may include performing the process of FIG. 1 in multiple instances over time. In some cases, the process of FIG. 1 may be performed concurrently for many users to produce many dashboards, e.g., with more than 1,000 concurrent users in different concurrent sessions.

Next, some embodiments may obtain feedback on the generated dashboard, as indicated by block 44. In some embodiments, the feedback may take any a variety of different forms. In some embodiments, the feedback may be obtained with eye tracking. Some embodiments may generate and display the dashboards in a test environment, with cameras directed at the user's eyes and with gaze tracking algorithms calibrated to track which portion of the screen a user is viewing. Some embodiments may generate heat maps indicating an amount of time a user's eye dwells upon different portions of the display screen. In some embodiments, the feedback may be total dwell time associated with each of several graph display concurrently in the dashboard, and graphs having relatively large dwell time within the boundary of the graph on the display may be inferred to be relatively effective. These dwell times may be determined on a graph-by-graph basis for each dashboard and may serve as feedback in some embodiments.

In another example, the feedback may include user interactions with the dashboard. For example, in some embodiments a user may select portions of the dashboard to navigate to richer views of relevant aspects of the underlying data. Such selections may be counted for each graph displayed over a plurality of dashboard instances, and those counts may serve as indicators or feedback on effectiveness of graphs for the related metrics. In some embodiments, these counts may be weighted based on a dwell time after a selection, for example, a count may be counted as 0.5 increments in virtue of a mere selection, and as 2 increments in virtue of a selection and a dwell time at the responsive graph exceeding a threshold time. Some embodiments may integrate and normalize amounts of time graphs in a dashboard are displayed in a display screen. In some embodiments, a dashboard may include more graphs than can be display concurrently, and the dashboard may support scrolling. Some embodiments may infer from a user scrolling to a position where a given graph is viewable and leaving the display screen in that scroll position for some duration that the display graph is relatively effective.

In another example, users may share graphs or templates with other users in a social network, like within an organization, including emailing links to graphs or templates, and some embodiments may accumulate these sharing actions into scores that serve as feedback, with shares providing a signal indicating an effective selection of the graph.

In some embodiments, feedback may be obtained in the form of explicit user expressions of preferences, like via a user interface associated with the graphs by which users may express a preference or dislike for the graph or may configure the dashboard to always include the graph. Such inputs (and those above) may be received and logged in association with the state of the session, such that other sessions with similar states may be processed to predictively configure a dashboard.

Next, some embodiments may adjust effectiveness scores based on feedback, as indicated by block 46. In some embodiments, the adjustment may include using the feedback as a training set in the operation of block 32 and using the pre-adjustment effectiveness scores as the selected initial effectiveness scores in block 34, before proceeding through the above-describe techniques to determine effectiveness scores. Some embodiments may vary the amount of adjustment driven by a given instance of feedback according to an age of the feedback, e.g., with a half-life weighting applied to adjustments.

As noted above, in some embodiments, dashboards may be customized based on the user's role, task, and previous usage of that user and others in the same role or performing the same task. In some embodiments, feedback may be aggregated across users having the same role, and that feedback may be used to generate a default graph-effectiveness matrix for users in that role with the techniques described above with reference to process 30. In some embodiments, upon a new user being placed in a role, the new user's dashboard may be generated based on a default template for the role. In some embodiments, users in a given role may be engaged in multiple tasks at different times, and some embodiments may generate task-specific dashboards. In some cases, a user may request the dashboard with an indication of the task entered via the user interface of an analytics application. In some embodiments, the techniques described above with reference to process 30 may be performed on feedback specific to a task to determine a default task-specific set of values for a graph-effectiveness matrix, and those task-specific values may be accessed to select graphs when a user begins performing that task. Some embodiments may cycle through a sequence of dashboards each corresponding to a given task, for example changing every 10 seconds, to apprise a user of information pertaining to different tasks.

In some embodiments, these techniques may be extended to individuals, with person-specific graph-effectiveness matrices (or a person-dimension of the matrix). In some embodiments, a given user's feedback may be input to the process 30 to transform a default graph effectiveness matrix for that user's role into one that is specific to the user. Later, when a request is received for a dashboard, embodiments may determine whether the request is associated with a user who has a user-specific graph-effectiveness matrix, in which case that user's graph-effectiveness matrix may be accessed in the process 10 to generate a dashboard. Alternatively, embodiments may determine whether the request is associated with a role or task, and if so, a roll or task-specific graph-effectiveness matrix that serves as a default for that role or task may be accessed in the process 10. Alternatively, if no role or task is associated with the request, or no role or task-specific graph-effectiveness matrix is available, some embodiments may access a default graph-effectiveness matrix formed with the process 30 without regard to person, role, or task.

Figure 3:
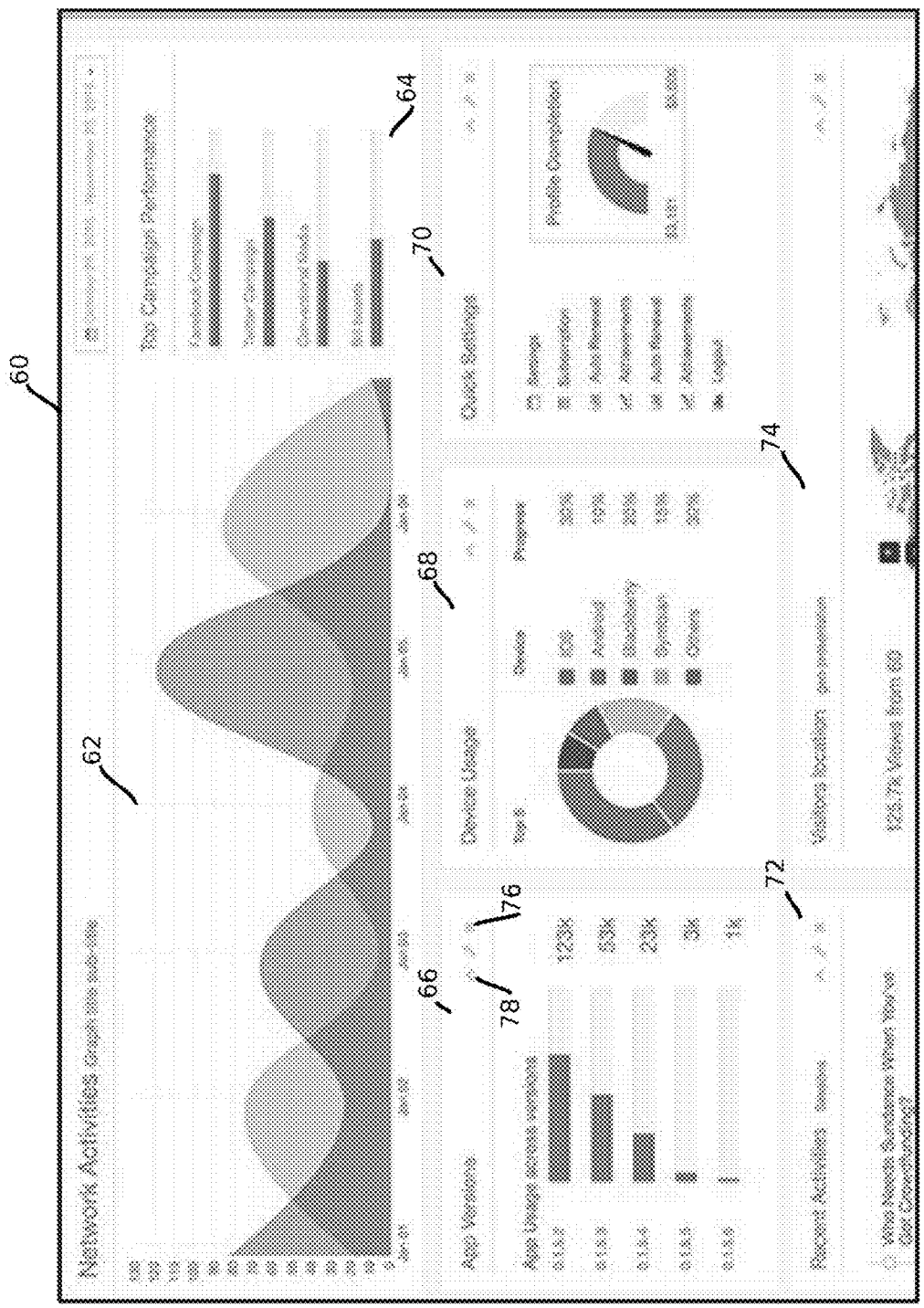
FIG. 3 is an example graphical user interface including a dashboard with graphs in accordance with some embodiments.

FIG. 3 shows an example of a dashboard 60 that may be displayed on a user's computer in accordance with the above-describe techniques. In some embodiments, the dashboard 60 is displayed in a web browser, or some embodiments may display the dashboard and a special-purpose analytics application (which may be a larger, or feature-rich application with analytics-related features). In some embodiments, the dashboard 60 includes a plurality of concurrently displayed graphs 62, 64, 66, 68, 70, 72, and 74. In some embodiments, these graphs are different graphs, or in some cases, the same graph may be used with different metrics or different sets of values of the same metric displayed in the graph. As illustrated, the graphs may be arranged with a tiling algorithm, e.g., with a k-d tree algorithm. In some embodiments, positions of the individual graphs may be selected based on a ranking according to effectiveness scores, with highest ranking graphs being positioned towards the top and right of the dashboard 60. In some cases, a graph importance score may be determined based on a weighted sum of the graph's aggregate effectiveness score and a score indicating how anomalous the visualized metric values are relative to a historical distribution. In some embodiments, some of the graphs may include user interfaces 76 and 78 by which a user closes a graph (e.g., with interface 76) or shares a graph (e.g., with interface 78) with another user (e.g., according to the techniques described below with reference to FIGS. 5-9). In some embodiments, these interactions may serve as feedback in the process of FIG. 2.

Figure 4:
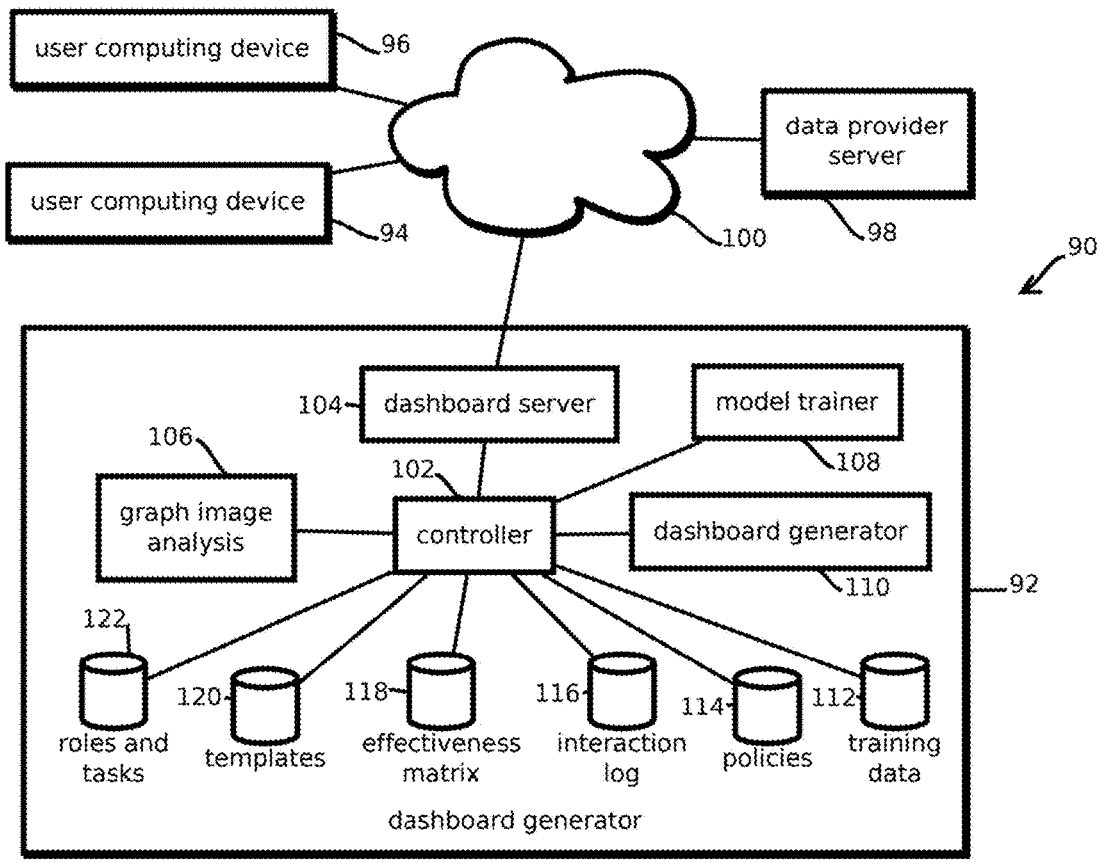
FIG. 4 is a block diagraph of logical and physical architecture of an example of a computing environment to predictively select graphs in accordance with some embodiments.

FIG. 4 shows an example of a computing environment 90 that may implement the above-describe techniques (though those techniques are not limited to this architecture, which is not to suggest that any other aspect is limited to the examples described). In some embodiments, the computing environment 90 is a distributed computing environment. In some embodiments, the computing environment 90 includes a dashboard generator 92 configured to execute the processes of FIGS. 1 and 2 to generate customized templates for forming dashboards like that shown in FIG. 3. The dashboard generator 92 may communicate with a plurality of user computing devices 94 and 96 over the Internet 100. In some embodiments, the computing devices 94 and 96 may be client computing devices that receive templates from the dashboard generator 92 via the Internet 100 and retrieve values of metrics to be displayed in graph specified by the templates from the data provider 98 via the Internet 100. As noted above, in some embodiments, the values displayed and graphs may be relatively sensitive to an organization, so some embodiments may separate the formation of the dashboard and the provision of data in two different computer systems, in some cases, with the data provider server 98 being on a different network domain, on a different local area network, at a different Internet protocol address, behind a different firewall, from the dashboard generator 92.

Two user computing devices and one data provider server are shown, but is expected that commercial implementations will include substantially more components, for example, more than 2,000 user computing devices and more than 500 data provider servers. In some embodiments, each of these components 94, 96, 98, and 92 may be geographically remote from one another, for example, spanning the continental United States or the entire world.

In some embodiments, the dashboard generator 92 includes a controller 102, a dashboard server 104, a graph image analysis module 106, a model trainer 108, a dashboard generator 110, and several data repositories. In some embodiments, the data repositories include training data 112, policies 114, interaction logs 116, a graph-effectiveness matrix 118, templates 120, and roles and tasks 122. In some embodiments, these repositories may be consolidated into a single or a smaller set of data repositories or subdivided.

In some embodiments, the controller 102 may coordinate the operation of the other components of the dashboard generator 92 to effectuate the functionality described. In some cases, the controller includes a task scheduler that schedules and causes the execution of the above-describe batch processes, as well as coordinating responses to requests received via the dashboard server 104, for example, in real time, like within 500 ms of a request. In some embodiments, the dashboard generator 92 performs the operations of FIGS. 1 and 2.

In some embodiments, the dashboard server 104 is a web server or an application program interface (API) server configured to receive requests for dashboards from user computing devices 94 or 96 and respond with a customized dashboard, for instance, with a template specifying graphs and locations of graphs, to the user computing devices. In some cases, the response may further specify that the user computing devices are to retrieve the data to populate the graphs from the data provider server 98.

In some embodiments, the graph image analysis module 106 may execute the above-described computer vision routines to enhance or generate training sets for the process of FIG. 2.

In some embodiments, the model trainer 108 may execute the routine of FIG. 2 to form and refine effectiveness matrices.

In some embodiments, the dashboard generator 110 may be configured to generate customized dashboards by executing the processes described above with reference to FIG. 1.

In some embodiments, training data may be stored in the training data repository 112. This data may be interrogated during periodic training sessions in which the effectiveness matrix is created or refined.

In some cases, some entities may have policies regarding which users may see which metrics. In some cases, these policies may be recorded in the policies data repository 114, which may specify which users can view which metric values. In some embodiments, the process of selecting graphs for the dashboard may include removing graphs prohibited by these policies for the viewer from a set of candidate graphs before selecting a set of top ranking graphs.

In some embodiments, the above-described forms of feedback may be stored in the interaction log 116.

In some embodiments, effectiveness matrices may be stored in the repository 118. In some cases, matrices may be indexed according to individual user accounts when those matrices are personalized, and in some cases, matrices may be indexed according to roles and tasks when those matrices are refined based on feedback associated with those roles and tasks. Some embodiments may parse a request for this information and select an effectiveness matrix associated with the person, role, and tasks associated with a request to the extent present. Alternatively, embodiments may select default matrices where portions of this information not provided in a request (e.g., retrievable based on information in the request, like a session identifier associated with a user account that is associated with a role).

Templates may be formed in advance of receiving a request, as noted above. Some embodiments may store those templates in the templates repository 120. In some cases, responses may be formed more quickly when the templates are formed in advance, though some embodiments may form templates at query time to provide more up-to-date templates, for example, accounting for recently arising features in the values of the metrics.

Data repository 122 may store records mapping people to accounts, preferences, roles, and tasks. In some embodiments, a user's past configuration preferences may be stored here, and those preferences may be accessed in the course of selecting graphs, with candidate graphs being ruled in, out, upranked, or downranked based on the preferences. In some cases, a user's preference that a given graph be included may override the above-selection process, such that some of the graphs in a dashboard are explicitly requested by the user, while others are automatically selected with the above-described techniques.

FIG. 4 shows a client-server architecture, but other embodiments may implement the present techniques with different designs, e.g., entirely client side, like in an executable application installed in an operating system of a user's computer.

As noted, many existing software tools for analyzing data are deficient in other ways beyond challenges with selecting graphs for single user session. In many cases, analytics programs are not well-suited for collaborative workflows. Often, a team of users collaborates to analyze data. For example, different users may have different areas of expertise, which may be relevant when facing relatively complex analyses. In the course of the collaboration, often, members of a team engage in collaborative computing sessions, for example, with screen sharing applications, such as those provided by WebEx™ or GoToMeeting_dot_com™.

Many extant sharing applications, however, are often not well-suited for use with analytics applications in a collaborative workflow. In many cases, sharing is accomplished nearly exclusively via video, which can be relatively bandwidth intensive and low-quality on high-resolution displays (which is not to suggest that use of video with the present techniques is disclaimed). Further, in many of these applications, sharing his in one direction only at a time, with a designated "leader" of the collaborative session directing a user interface that is shown identically on each of the different user's computers, while the other users sit passively and observe. This user experience often deprives the team of many of the benefits of collaboration and slows knowledge sharing and the data analysis. Often, effective exchanges of information include relatively frequent back-and-forth between members of the team that are impeded by traditional sharing applications that rely heavily on video and require that different members of a session be designated as a "leader" to control a graphical user interface for other members of the session (again, which is not to suggest that the designation of a "leader" in such an environment is disclaimed). And in many cases, different members of a team engaged in a collaborative session wish to view the same data through different graphical representations, also referred to as graphs. Moreover, in many cases, configuring a data analytics application for a given session can be relatively time-consuming, as analytics applications are often relatively feature-rich and can take time for the various users to configure the relevant features for a given session.

These issues with collaborative data analytics, and other issues described below, may be mitigated by some embodiments of a process 200 described below with reference to FIG. 5. Some embodiments may facilitate knowledge sharing while maintaining preferred modes of visualization. Some embodiments provide for dashboard sharing in which the system learns which dashboard graphs are preferably shared among individuals. Some embodiments records for each task: the task, logs and databases and recommended and preferred methods for visualizing data; the other roles/persons brought into solving the task and which visualizations are shared. In some embodiments, sharing is simultaneously bi-directional. In some embodiments, not all dashboard elements are shared allowing some participants to drill down. In some embodiments, participants can toggle between their preferred visualization and the shared visualization of the same data set.

In some embodiments, this process may be executed within the computing environment 90 described above with reference to FIG. 4. The functionality described may be allocated in various ways among the different components of that computing environment, and examples of different logical and physical architectures are described below. In some cases, instructions to effectuate the corresponding functionality may be stored on various tangible, non-transitory, machine-readable media in the form of program code that when executed by the corresponding computing device, gives effect to the corresponding functionality. In some cases, the media may be distributed among different computing devices, with different computing devices having different subsets of the program code and implementing different portions of the functionality.

In some embodiments, the process 200 is initiated upon a given user initiating a collaborative session in a data analytics application. Examples of a data analytics application are described above with reference to FIGS. 1 through four. In some embodiments, the application may include a dashboard, like that described above with reference to FIG. 3, and in some cases, metrics and graphs depicting those metrics may be selected with the techniques described above. In some cases, the dashboard may be customized based on the techniques described above, for instance according to a user's past behavior, a user's role, and a task at hand.

As noted, data analytics tasks arise in a relatively diverse set of use cases. An example use case serves to illustrate some of the present techniques. In some embodiments, the process 200 may be initiated upon a support "ticket" being opened in an issue tracking system, like a system by which users report bugs and request support from IT professionals relating to a network or application. In some cases, the ticket may include a description of the issue and various metadata, for example, specifically identifying an application at issue and an aspect of the problem. In some cases, the ticket may be generated programmatically by performance monitoring applications detecting lower than a threshold level of performance (or the absence of execution). In some embodiments, the process 200 may be initiated based on a ticket's context, for instance, a task may be identified corresponding to the ticket, and a dashboard may be initialized based on the task in accordance with the techniques above.

In some embodiments, the process 200 includes instructing a first computing device to display a first graph depicting a first metric, as indicated by block 202. In some cases, the first computing device may display the first graph in a dashboard in a graphical user interface of the first computing device (e.g., a desktop computer, laptop computer, or mobile computing device, like a tablet or cell phone). In some embodiments, the graph may be depicted within a dashboard within a web browser window or within a window of a special-purpose data analytics application. In some embodiments, the instruction may be sent by a remote server, for example hosting a software-as-a-service application that provides access to a data analytics application in a web browser or provides instructions to a special-purpose application via an application program interface (e.g., a native mobile application). In some embodiments, the instruction may be output by an application resident on the first computing device.

The instruction may take a variety of different forms, each of which cause the first computing device to display the first graph depicting the first metric. In some cases, the instruction takes the form of sending data to populate the first graph and a template, or in some cases, the instruction may explicitly include a command to display the first graph depicting the first metric. The depiction of the first metric may include a first set of values of the first metric, for example, a range of values. The graph may take a variety of different forms in accordance with the techniques described above, and in some cases, the first graph may be selected in accordance with the above-describe techniques for personalizing and otherwise customizing a dashboard in which the graph appears. In some embodiments, the first computing device may respond to the instruction by displaying the graph.

Next, some embodiments may determine that the first graph is to be shared on a second computing device, as indicated block 204. In some embodiments, the second computing device may be a computing device associated with a different user from that of the first computing device in block 202. For example, a user may become associated with computing devices by logging into an account or based on the IP address of the computing device being associated with the user.

In some embodiments, users are personally identified, or in some cases, embodiments associate arbitrary identifiers of users to distinguish between users within a session, without uniquely identifying the user in a larger context. In some embodiments, the determination explicitly includes identifying the second computing device, and the second user, or in some embodiments, the determination is one that causes a second computing device and a second user to be arbitrarily selected from among a pool of users (e.g., those with a designated role) or computing devices.

For example, some embodiments may include determining that another user with a given role is to be added to a collaborative session, for instance, in response to a parameter of a ticket like those described above indicating that a particular technical expertise may be relevant to troubleshooting an issue. In some embodiments, the determination may be based on a pattern of behavior in past sessions. For example, some embodiments may log previous troubleshooting sessions with a analytics application and based on that log, infer that the second user or a user with a role of the second user is added to a collaborative session with more than a threshold frequency when a context of the ticket is presented by or to the first user or by users having a role of the first user.

In some embodiments, the determination is that a determination that the first user has requested that the first graph be shared or that a set collaborative session be initiated via a graphical user interface of the first computing device. The determination may be made by the first computing device, for example, by a special-purpose application, or the determination may be made by a remote server, for instance, in response to inputs received and sent by the first user or based on an inference in accordance with previous sessions.

In response to determining that the first graph is to be shared, some embodiments may send a message to the second computing device, for example, an email or alert with a link or other user interface that causes a dashboard to be formed (e.g., generated or modified) for the second computing device and the user to be added to a collaborative session with the first user.

Some embodiments include inferring that the second user prefers to view the first metric in a second graph, as indicated by block 206. The second graph may be different from the first graph with which the first user reviews the first metric. For example, the first user may wish to view a given metric in a pie chart, while the second user wishes to view that metric in a stacked bar graph or heat map. Embodiments may infer such differences across the various pairwise permutations of graphs described above. In some embodiments, the inference may be the result of customizing a dashboard for the second user and reaching a different set of customizations from that that occurred when customizing a dashboard for the first user. In some embodiments, the inference may be based on a record of previous interactions with the second user in which the second user (or others in the same role) selected the second graph to review the first metric. For instance, some embodiments may determine that the second user selected the second graph to replace the first graph or other graphs more than a threshold amount of times in previous sessions (like more than a threshold frequency). In some embodiments, the inference may be based on a role of the second user, for instance, determining that users having the second user's role made such a change more than a threshold amount. In some embodiments, the customization of the dashboard for the second user may be based on the previous interactions with the second user.

In some embodiments, the inference may be based on a trained machine learning model trained in advance of a current collaborative session. For example, some embodiments may periodically, like in a batch process, ingest logs of previous sessions between users and form or update the model. In some embodiments, the techniques described above for personalizing or otherwise customizing dashboards may be used to train the model, and the model may include the above-described graph-effectiveness matrix, in some cases with a dimension for a role, and a dimension for a user, with a plane (or other slice) of the user dimension corresponding to the second user. In some cases, the inference may be made by the second computing device, for instance, by a special-purpose application or by a web browser in which the second graph is displayed in a dashboard in the second graphical user interface. Or in some embodiments, the inference may be made by a remote server coordinating between the first computing device and the second computing device.

Next, some embodiments may instruct the second computing device to display the second graph depicting the first set of values of the first metric, as indicated by block 208. Instructing the second computing device to display the second graph may take any of the various forms described above by which the first computing device is instructed to display the first graph. In some embodiments, instructing the second computing device to display the second graph is performed in response to the inference of block 206 and the determination of block 204. In some embodiments, the second graph depicts the full set of values of the first metric displayed in the first graph, or in some embodiments, the second graph depicts a superset or subset of the values of the first metric displayed in the first graph. In some embodiments, the first and second computing devices may display the first and second graphs, and corresponding first and second dashboards, in their respective first and second graphical user interfaces, concurrently, such that both users are viewing the first metric at the same time, for at least some of the time, in different graphs. In some embodiments, the second graph may be supplemented with an instance of the first graph on the second computing device, such that the second user can see both the view presented to the first user and the view that is inferred to be preferred. A view is "preferred" when the selection probabilistically (or exactly) accords with previous actions by the user or others in a similar role to the user, for example, in a similar context, and inferring that a given graph is "preferred" does not require that an internal mental state of the second user be correctly ascertained.

In some embodiments, the second graph may also be added to the dashboard for the first user, such that each of the first user and the second user each see a similar graphical user interface. Or in some embodiments, to avoid taxing the first user cognitively, some embodiments may only add the second graph to the second user's dashboard, without adding the second graph to the first user's dashboard.

Figure 5:
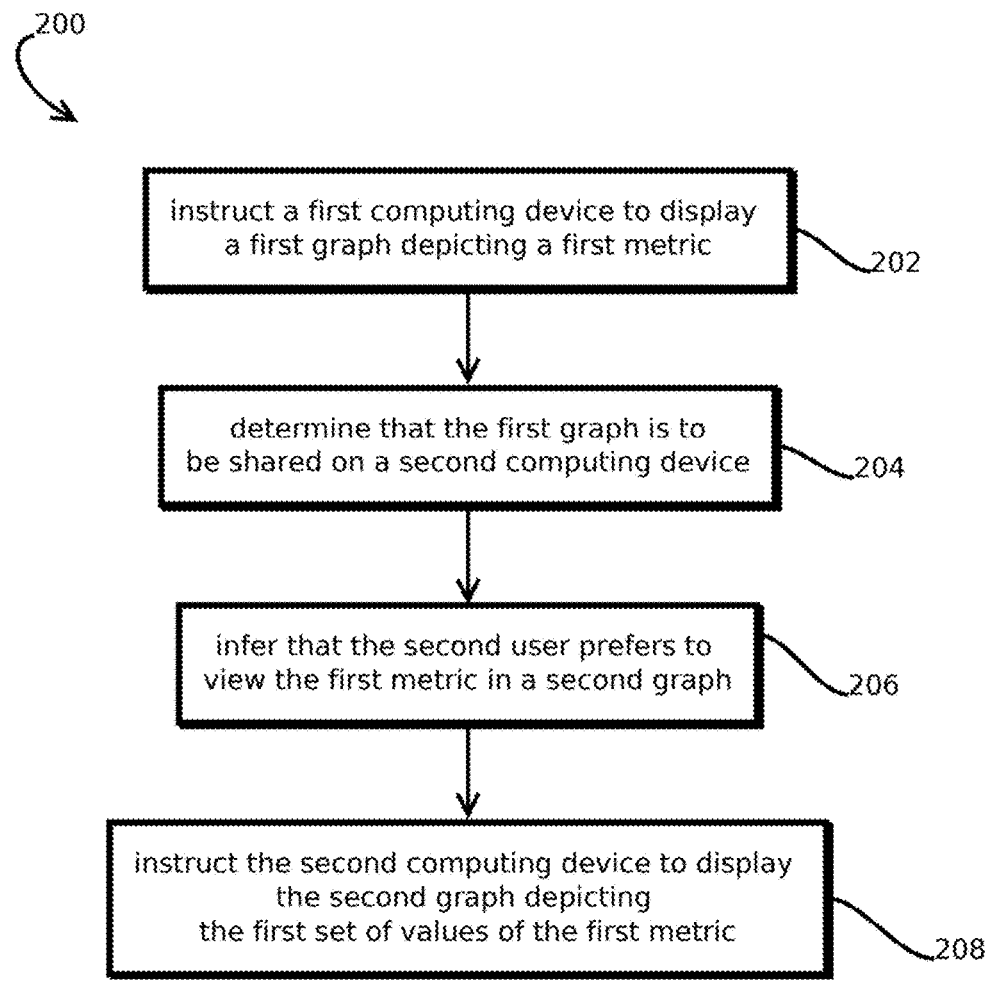
FIG. 5 is a flow chart of an example process to instantiate a collaborative session with different graph predictions for different users in the session accordance with some embodiments.
Figure 6:
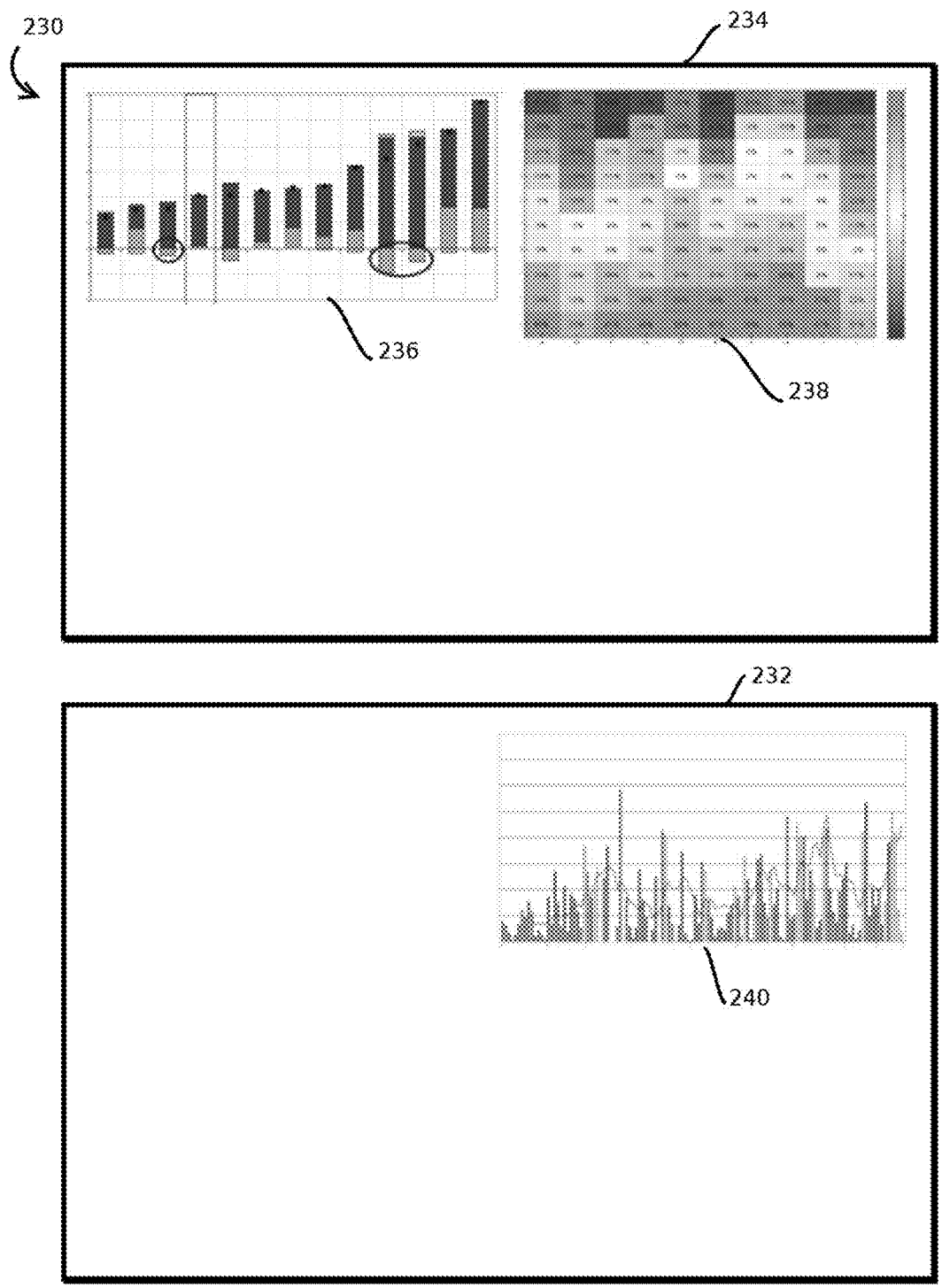
FIG. 6 is a first state of a pair of graphical user interfaces in an example of a collaborative session in accordance with some embodiments.
Figure 7:
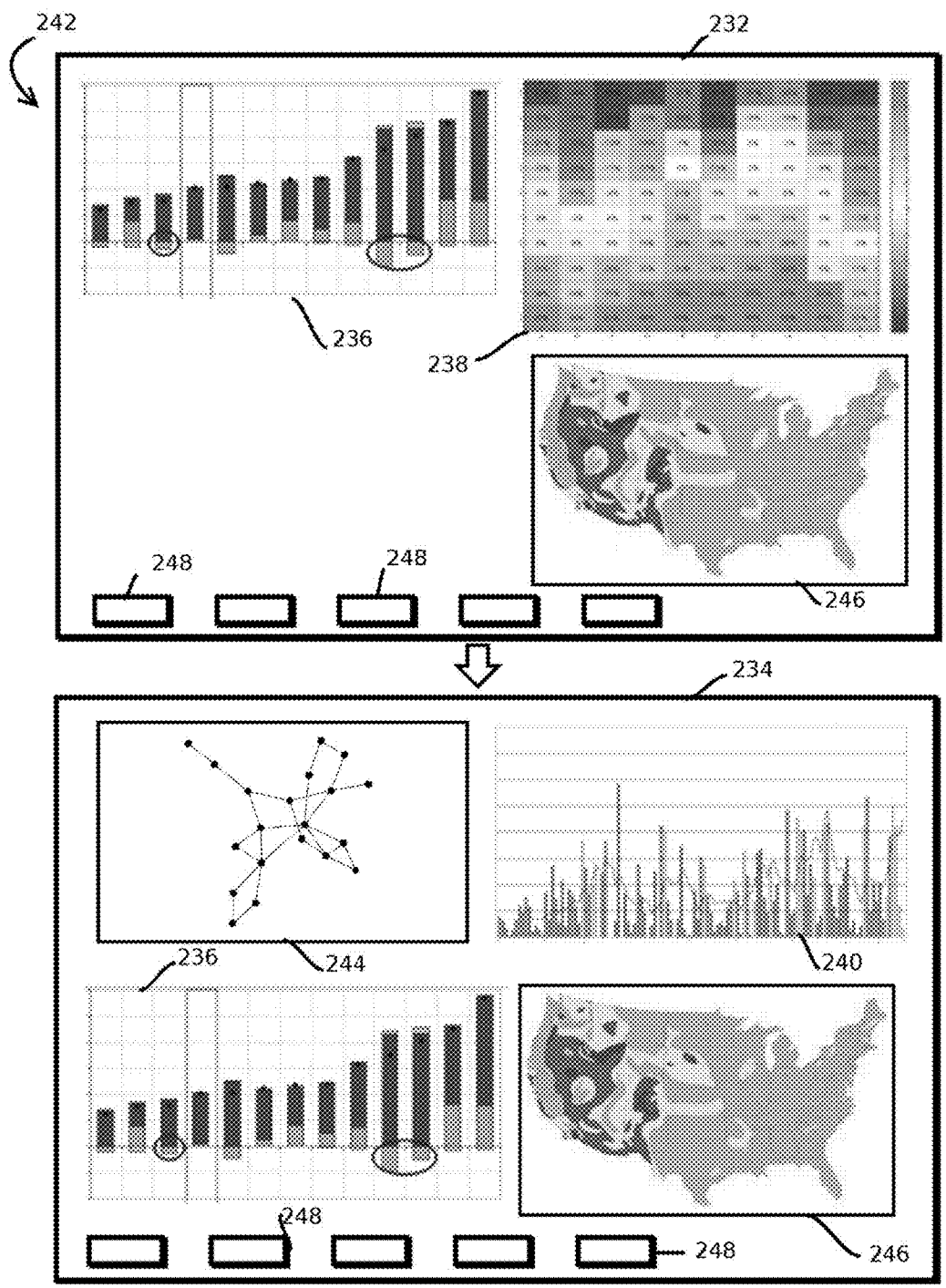
FIG. 7 is a second state of the pair of graphical user interfaces in the example of a collaborative session in accordance with some embodiments.
Figure 8:
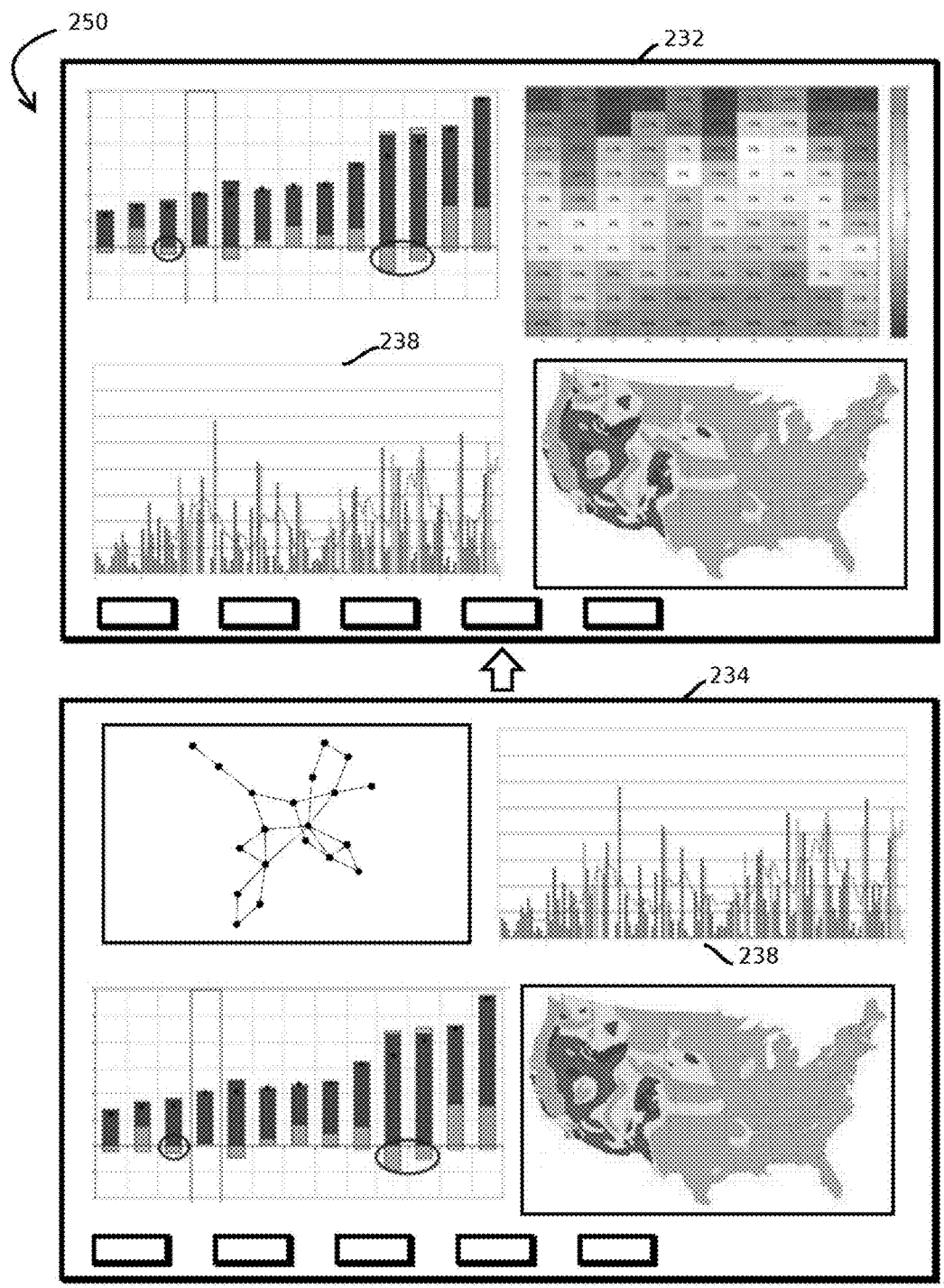
FIG. 8 is a third state of the pair of graphical user interfaces in the example of a collaborative session in accordance with some embodiments.
Figure 9:
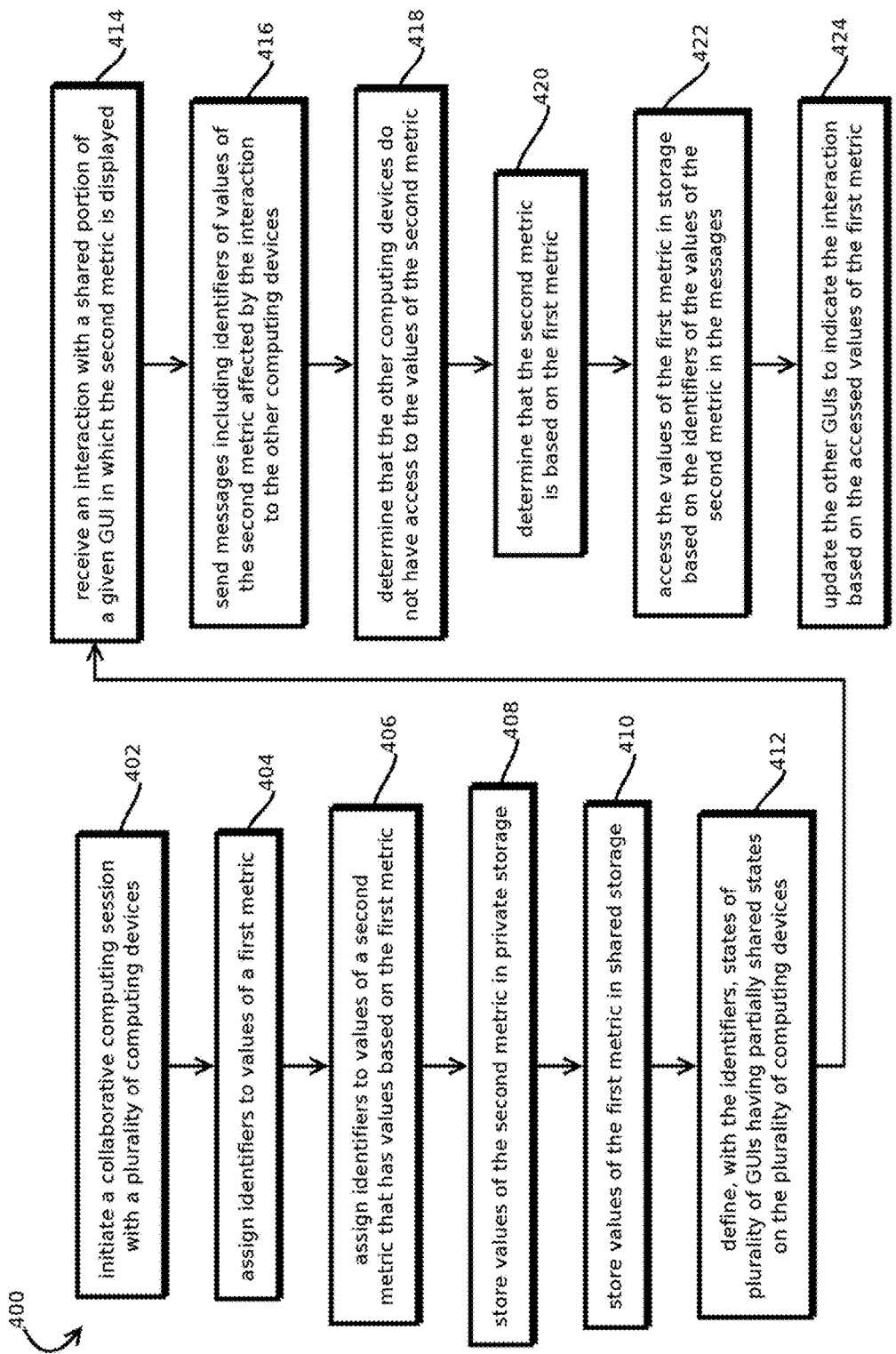
FIG. 9 is a flowchart of an example process to track data across different computing devices in a collaborative session with unique data identifiers in accordance with some embodiments.

FIGS. 6 through 8 illustrate an example of a collaborative session that may implement the process 200 of FIG. 5. FIG. 6 shows graphical user interfaces of a computing environment in a first state 230, before a collaborative session is initiated. The computing environment includes a dashboard 232 of the first user and a dashboard 234 of a second user. The present techniques are described with reference to collaborative sessions involving two users, but it is expected that use cases will involve substantially more in some in applications. In the first state 230, the collaborative computing session has not been initiated, and the two dashboards 232 and 234 are not in communication with one another yet, in some embodiments. As illustrated, the first dashboard 232 includes two graphs 236 and 238. In some cases, these graphs may be populated within the dashboard 232 using the techniques described above with reference to FIGS. 1 through 4, for instance, based on a given task and role of the first user operating the first dashboard 232. The second user having a separate computing device displaying the second dashboard 234 may be working on a different task, for instance, involving another graph 240 within the dashboard 234.

Next, the first user may input a request via the first dashboard 232 to share the graph 236 with the second user in the second user's dashboard 234, as shown in FIG. 7. Upon this request, a collaborative session may be initiated. A session record may be created in memory (e.g., in the user devices 94 and 96 or the dashboard generator 92) to associate with the session a network address of the first users computing device displaying the first dashboard 232 and a network address of the second users computing device displaying the dashboard 234.

FIG. 7 shows a next state 242 of the collaborative computing environment. As shown in FIG. 7, the second user's dashboard 234 now displays the graph 236 shared by the first users via the first user's dashboard 232. In some cases, the first user may request to share by right clicking a given graph and selecting a share option from a menu or by selecting some other aspect of a user interface of the dashboard 232. An event handler executed by the first user's computing device may receive this input, compose a message by which the request is communicated, and cause the request to be sent (e.g., to the computing device of the second user or to an intermediate server).

Upon initiating the collaborative session, and receiving from the first computing device (either directly or indirectly via a server that coordinates the session) an instruction to display the first graph and the metric therein (e.g., via a server or directly in a peer-to-peer exchange), some embodiments may determine that the second user wishes to this to view the first metric in a different graph 244. Thus, the second dashboard 234 may include both the graph 236 displaying the metric shared by the first user and the graph 244 displaying the same metric. The graph 244 may be an inferred preferred form of viewing the metric for the second user.

Some embodiments may further modify one or both dashboards 232 and 234 in response to the current state 242 of the collaborative session (or a sequence of past states). For example, some embodiments may infer from a log of previous sessions that both the first user and the second user wish to view another graph 246 of another metric, and that other graph 246 may be added to both of the dashboards 232 and 234. Or in some embodiments, this inference may be made for only one of the two users.

Some embodiments may determine to add the graph 246 by a remote server to which the two computing devices are connected (e.g., at the dashboard generator 92), or the inference may be made on a client-side program. Some embodiments may determine that more than a threshold amount (e.g., count or frequency or freshness weighted score) of previous sessions between the two users resulted in one or both of the user is adding the graph 246 depicting another metric. Or some embodiments may determine that more than a threshold amount of previous sessions between users in the same roles resulted in one or both of the users adding this graph 246. In some cases, the inference is that the two users wish to view another metric, but different graphs may be selected to view the metric on the different computing devices. In some embodiments, the techniques described above with reference to FIGS. 1 through 4 may be augmented with an additional dimension of the graph-effectiveness matrix that includes a pairwise combination of analysts, and additional graphs may be added based on graph effectiveness scores indexed by the dimension pertaining to the first user and the second user as a pair.

As shown in FIG. 7, the first user sharing the graph 236 has resulted in both the graph 236 showing the same metric being added to the second dashboard 234 and the different graph 244 showing the same metric being added to that dashboard. Further, initiating the collaborative session may cause the graph 246 to be added to both dashboards. As illustrated, another graph 238 on the first dashboard 232 that was not shared is not added to the second dashboard 234. Further, the graph 238 already on the second dashboard 234 is not added to the first dashboard 232. Thus, the two dashboards 232 and 234 are partially, but not fully, synchronized, in this example.

In some embodiments, both users of both dashboards 232 and 234 may add, modify, or remove graphs and indicate with the input requesting this change whether the change is to be reflected in the other person's dashboard (or some embodiments may default to updated views). In some embodiments, user interactions with a shared graph result in visual changes to that graph that are displayed in both dashboards 232 and 234. For example, the second user may select a given data point in graph 234, causing the data point to be highlighted, deselected, or supplemented with metadata (like a comment) in the dashboard 234. This change may cause a message to be sent back to the first computing device. The first computing device, upon receiving this message, may apply a similar or the same visual update to the same data point in the same graph (which may be in the same or a different position in the first user's dashboard). In some cases, a user selection of the data point (or group of data points), in one shared graph causes visual changes to that shared graph and visual changes to other graphs depicting the same data. For example, the first user may highlight a range of metric values in the graph 236, and the visual appearance of metric values within that range may change in both the graphs 236 and 244, for example, the data values may be highlighted, enlarged, or otherwise visually augmented to signify the selection to the user. In some cases, client applications may execute event handlers that receive user interface inputs (like on-click events, on-touch events, touch-release events and the like) and take responsive action, which may include updating a visual display of a local dashboard and composting and sending a message that, upon being received by other computing devices in a session, causes those other computing devices to update their respective displays accordingly). In some embodiments, both users may concurrently interact with data points in the respective dashboard 232 and 234, and the visual state of the two dashboards 232 and 234 may be concurrently updated, for instance, with messages being exchanged in both directions between the first computing device and the second computing device.

In some embodiments, these update messages may include identifiers of the affected metric values (or other data points) and an identifier of an interaction with the metric values, for example, a data point selection, de-selection, or other interaction, like adding a note to be displayed in a pop-up bubble. In some embodiments, these messages may be sent directly between the first and second computing devices showing the first and second dashboards 232 and 234. For example, some embodiments may establish a peer-to-peer WebRTC connection, with a remote server establishing initial handshake, and then with the first computing device and the second computing device sending messages directly to one another with these updates, without the messages passing through the server. In some cases, upon a user interacting with a given graph to select a given data point, a message may be sent from that user's computing device, with a IP address of the second user's computing device in the to field of a packet header, and that message may be sent directly to the second user's computing device, without passing through an intermediate server. In some cases, these messages may be sent with the data channels of the WebRTC protocol, for instance, between web browsers or between native applications. In some embodiments, both audio and messages indicating interactions may be sent between the two computing devices, for instance, with multiple WebRTC connections, like via a data channel and via an audio or video channel. In some embodiments, each of the two computing devices displaying the dashboards 232 and 234 may include an event handler that receives these messages and executes update routines that update the respective graph in the respective dashboard. In some cases, peer-to-peer messaging is expected to be relatively secure, as the server does not receive some of the context and communications between the two analysts. Further, this is expected to reduce bandwidth and offer lower latency response times on the two interfaces, as fewer network hops occur, particularly when both analysts are on the same local area network. That said, some embodiments do not use peer-to-peer communication (e.g., messages may be routed through a server), which is not to suggest that any other feature is not also amenable to variation.

In some embodiments, update messages are expected to be substantially less bandwidth intensive than shared video and support two-way interaction with the shared portions of the dashboards 232 and 234. Thus, in some embodiments, the two dashboards bidirectionally communicate user interactions with subsets of the dashboard that have been shared. Or in some embodiments, a collaborative session may include three or more users, and the messages may be broadcast to each of the three or more users' computing devices to cause the three or more dashboards to synchronize with respect to the shared portions of the dashboards. In some embodiments, a given user may have multiple collaborative sessions ongoing concurrently, and different portions of that user's dashboard may be updated by messages from different partners in different collaborative sessions. Or, as noted above, some of the present techniques may be used in a session with a single user, without collaborating with others, which is not to suggest that other features may not be omitted in some embodiments.

Some embodiments may infer based on a current state of a collaborative session a workflow in which the participants of the session are engaged and display user inputs to access resources relevant to that workflow. For example, some embodiments may add to the dashboards 232 and 234 a plurality of user interface inputs 248 by which the user may navigate to resources relevant to an inferred workflow. For example, such resources may include another metric, another graph, a link to data underlying metrics, adding another user to the collaborative session, or launching a different application in a specified state by which remedial action may be taken. Some embodiments may receive user selections of these inputs and effectuate the requested action.

In some embodiments, the user interface inputs 248 may be different on the different dashboards 232 and 234. The inputs 248 may be chosen based on different roles of the respective users. Or in some embodiments, the user inputs 248 may be the same. In some embodiments, the user interface inputs 248 may be sequenced in accordance with their corresponding resources expected sequential use in a workflow, for instance, first to last from left to right. Or the user interface inputs 248 may all pertain to an inferred next step, for example, the four most likely next steps inferred from a sequence of the current and last state of the dashboards.

Some embodiments may score subsequent resources according to inferred probability of access based on a log of previous sessions (e.g., describing a sequence of dashboard states and user inputs at each state) and add user interface elements corresponding to those resources for those resources scoring above a threshold count in a ranking or score value. In some embodiments, the inferences of the workflow and subsequent resources may be made by the client computing devices or a server. In some embodiments, a machine learning model may be trained in advanced of a current session. That machine learning model may receive as input a current state (or sequence of states) of the session, and the machine learning model may output a set of resources for which user interface inputs 248 are to be added. A variety of different techniques may be used to form and train such a machine learning model. In some embodiments, previous logged sessions may include a record of a current state of each dashboard and the overall session and a resource accessed. Some embodiments may group previous sessions with the same attributes (e.g., pairwise combinations of user roles) and then rank the accessed resources according to frequency of access in the respective group, with the highest ranking resource being designated as a next resource to be suggested by a adding a user interface input 248. In some embodiments, a sequence of subsequent resources may be predicted by training a hidden Markov model or recurrent neural network with such a log. The trained model may predict subsequently accessed resources based on a current state or sequence of states.

FIG. 8 shows a subsequent state 250 of the collaborative computing session. In this state, the second user has shared the graph 238 with a different metric with the first user on the first user's dashboard 232. In some embodiments, the second user's computing device may receive an input via the dashboard 234 designating the second graph 238 and instructing the computing device to cause the second graph 238 to be shared with the first user. For example, some embodiments may include an event handler that detects an event in which the second user right clicks on the graph and select the menu option to share. Some embodiments may cause a message to be passed from the second computing device having dashboard 234 to the first computing device having dashboard 232. The first computing device's appropriate event handler for message passed may receive the message, determine that the second graph 238 is to be added, and add that graph to dashboard 232. In some embodiments, messages instructing another dashboard to add a graph may specify the graph and identify values of the metric to be shown, without including values of the metric (e.g., listing data identifiers for values, without including the values themselves). In some cases, these values may be retrieved from a remote data source. For example, a portion of a template for defining a dashboard may be sent, and the receiving device may perform the operations described above by which such templates are populated with data from a data server. This is expected to reduce bandwidth between computing devices, while reducing an attack surface of a system in which such data is held, though not all embodiments afford this benefit, which is not to suggest that other features are not also amenable to variation. Thus, as indicated by the interaction of FIG. 8, in some embodiments, sharing may be bidirectional, between the first dashboard 232 and the second dashboard 234, in some cases concurrently, without a given user passing the role of a "leader" of the session and without exchanging images of the graphs in video. In some embodiments, the bidirectional sharing is simultaneous (e.g., with updates occurring within two seconds of an interaction being received, or faster, like within 500 milliseconds).

As noted, a given collaborative computing session may include in session state (for example in various dashboards) graphs depicting various values of various metrics. And in some cases, the values themselves may be retrieved from a different computing device, such as a remote data server, rather than being passed within the messages themselves. In some cases, the data may be resident in various tables, in various databases, in various remote servers. Where the data is distributed, referring to the data in such messages may be difficult, as different data sources may have different data schemas and different address spaces and name spaces. To mitigate these problems, some embodiments may assign each data element (e.g., a given instance of a value of a metric) a data unique identifier. The data unique identifier may be a value in a namespace (e.g., an address space) specific to the collaborative session or specific to a computing system hosting the session, separate from a namespace and address space of one or more sources of the data. Messages sent between computing devices indicating that various values of various metrics are to be displayed, highlighted, selected, augmented, annotated, or the like, may reference these data unique identifiers to indicate which graphical elements in which graphs corresponding to those data items are to be updated or changed. In some cases, subsets of data implicated in a shared session may be private to some of the users, in which cases, some embodiments may take steps to update non-private data to reflect updates to the extent permitted by policies by which data is kept private.

In some embodiments, the process 400 includes initiating a collaborative session with a plurality of computing devices, as indicated by block 402. This may include the operations described above with reference to FIGS. 5 through 8.

Next, some embodiments may assign identifiers to values of a first metric, as indicated by block 404. In some cases, this may include assigning data unique identifiers that are unique within a collaborative session or are unique within an address or namespace of a computing system hosting the collaborative session. In some embodiments, the day unique identifiers are hash values, such as MD5 hash values or SHA256 hash values, based on the data being identified (e.g. a hash of an identifier of the metric and values of the metric, in some cases including metadata). In some embodiments, identifiers may be assigned to the values of a plurality of different metrics. In some embodiments, the identifiers may be assigned by the client computing devices, or in some cases, a remote server hosting the collaborative session may assign the identifiers. In some embodiments, the identifiers may be assigned by a data server from which data is retrieved to populate templates.

Next, some embodiments may assign identifiers to values of a second metric that has values based on the first metric, as indicated by block 406. As noted above, a given instance of data may yield various metrics, and in some cases, some of those metrics may be based on one another. For instance, a metric of social network shares per day may serve as the first metric, while a metric of social network shares per week may serve as the second metric, which may be a sum of each of the first metric values over a seven day duration. In some cases, relationships between these metrics may be indicated in metadata of the metrics. For example, an identifier of the second metric may include in metadata a list of all metrics and other data sources by which the metric is calculated.

Next, some embodiments may store values of the second metric in private storage, as indicated by block 408, and store values of the first metric in shared storage, as indicated by block 410. In some cases, the private storage may be storage only accessible to one of several (or a subset) of computing devices in a collaborative session, while data stored in the shared storage may be accessible to each computing device within a session. In some embodiments, the data may be stored in a central repository maintaining session state, or in some cases, the data may be stored on the client computing devices, such as those displaying the dashboards. For example, some embodiments may store the data is in a dispute distributed hash table, with the data being retrievable by accessing the distributed hash table with the data unique identifier in a query. In some cases, some of the data may be kept private because some participants in some collaborative sessions may not have permission to view the data in their current role in accordance with one of the above-described policies, or users may designate certain data as private to certain users of a collaborative session, for instance, when sharing, to facilitate a side conversation. Embodiments may access these policies or receive these inputs and prevent access to the data as needed.

Next, some embodiments may define, with the identifiers, states of a plurality of graphical user interfaces having partially shared states on the plurality of computing devices, as indicated by block 412. In some cases, this may include causing the computing devices to display the various dashboards described above, like those discussed with reference to FIGS. 6 through 8. In some embodiments, each graph may be displayed in accordance with a portion of the template corresponding to that graph that references the data, and the data may be supplied for the graph by retrieving from the shared or private storage those values having data unique identifier specified in the template describing the graph. Thus, in some cases, each device may query a local or remote storage, for instance, at a central authority, like a data server, or distributed among a plurality of peers in a distributed hash table, those values corresponding to a set of data unique identifiers specified in a message instructing the computing device to add a graph depicting the values to a dashboard.

Next, some embodiments may receive an interaction with a shared portion of a given graphical user interface in which the second metric is displayed, as indicated by block 414. In some cases, the interaction may include a user highlighting, annotating, deselecting, or the like, a given data point or range of values.

Next, some embodiments may send a message including identifiers of values of the second metric affected by the interaction to the other computing devices in the collaborative session, as indicated by block 416. In some cases, the message may be sent from a given client computing device directly to another client computing device, without passing through a server, in a peer-to-peer message, or in some embodiments, the messages may be sent to a server that coordinates the collaborative computing session. In some embodiments, the message may include a description of the interaction and data unique identifiers of values affected by the interaction. Each of the computing devices in the collaborative computing session may receive the sent messages.

Next, some embodiments may determine that the other computing devices do not have access to the values of the second metric, as indicated by block 418. In some cases, a subset of the other computing devices may not have access to these values, or in some cases, all of the other computing devices in a given session may not have access to the values of the second metric. In some cases, the determination may be made by querying a data repository for data unique identifiers (e.g., in a centralized, local, or distributed repository), and receiving a response code indicating that the data is private. For instance, the values of the second metric may be stored in private storage, as discussed above with reference to block 408. This scenario may occur, for example, when a manager interacts with a metric to which lower-level employees do not have access, but which is based on values in metrics to which the lower-level employees do have access.

Next, some embodiments may determine that the second metric is based on the first metric, as indicated by block 420. In some cases, the message identifying the second metric, the type of interaction, and the data unique identifiers of affected values may include or reference a list of metrics that constitute the second metric, and the present determination may be accomplished by detecting the first metric among that list. In some cases, this determination may be performed by the client computing devices (e.g., user computing devices 94 or 96) or by a centralized server (e.g., in dashboard generator 92).

Next, responsive to this determination, some embodiments may access the values of the first metric (or other identified values) in storage based on data identifiers of values of the second metric in the message, as indicated by block 422. Or some embodiments may determine that relevant values of the first metric are already displayed in the other graphical user interfaces are ready to receive visual updates. In some cases, each given data unique identifier may be associated with data unique identifiers of values by which the value referenced by the given data unique identifier is calculated. Some embodiments may recursively crawl a graph of data unique identifiers to identify some, and in some cases, all data unique identifiers of values by which a given private value is calculated, and those values may be accessed to the extent not restricted from a given computing device attempting to access the values to update a display.

Next, some embodiments may update the other graphical user interfaces to indicate the interaction based on the accessed values of the first metric (and other values), as indicated by block 424. For example, a manager may highlight a given value of the second metric that other users do not have privileges to see in their dashboard while attending a collaborative computing session. A message may be sent to the other users computing devices indicating the selection, and the other computing devices may access and highlight values upon which that selected value is based, thereby facilitating conversation between the users and data analysis, without revealing confidential information to participants.

Figure 10:
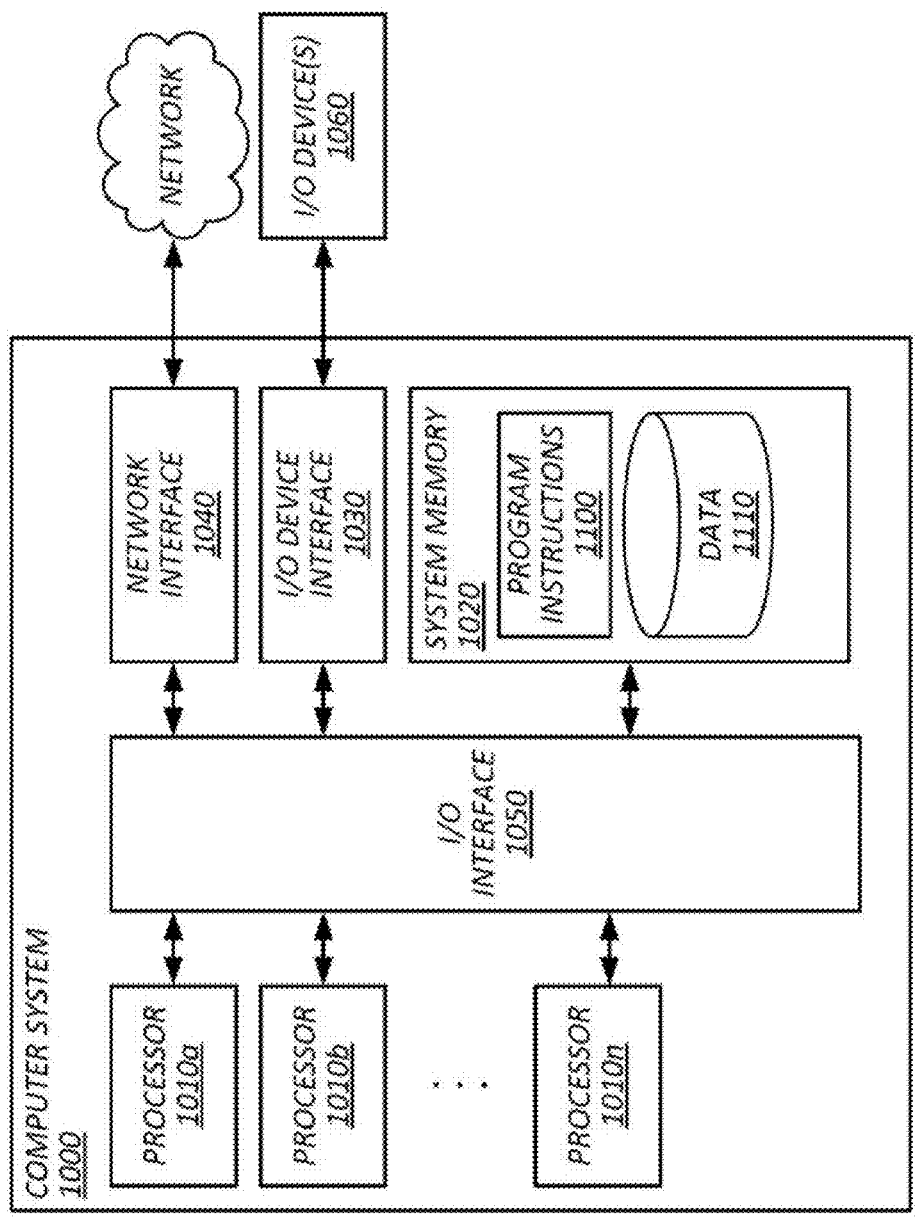
FIG. 10 is an example of a computer system by which the present techniques may be implemented.

FIG. 10 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these inventions into a single document because their related subject matter lends itself to economies in the application process. But the distinct advantages and aspects of such techniques should not be conflated. In some cases, embodiments address all of the deficiencies noted herein, but it should be understood that the present techniques are independently useful, and some embodiments address only a subset of such problems or offer other, unmentioned benefits that will be apparent to those of skill in the art reviewing the present disclosure. To manage examination costs, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the present techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the"

include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated clauses:
1. A method of conducting a collaborative session between two analytics graphical user interfaces (GUI) presented on two different computing devices, the method comprising: instructing a first computing device associated with a first user to display a first GUI having a first graph depicting a first set of values of a first metric; determining that the first graph is to be shared on a second computing device associated with a second user in a second GUI; inferring that the second user prefers to view the first metric in a second graph, different from the first graph, based on a record of previous interactions with the second user in which the second user selected the second graph to view the first metric; and in response to the inference and the determination, instructing the second computing device to display in the second GUI the second graph depicting at least some of the first set of values of the first metric, the first and second computing devices displaying the first and second graphs, respectively, concurrently.
2. The method of clause 1, comprising: while displaying the first and second graphs: receiving, via the first computing device, a first interaction by the first user with the first graph; instructing the second computing device to update the second graph in the second GUI to indicate the first interaction, wherein the second graph is updated based on a first message sent over a network between the first computing device and the second computing device; receiving, via the second computing device, a second interaction by the second user with the second graph; and instructing the first computing device to update the first graph in the first GUI to indicate the second interaction, wherein the first graph is updated based on a second message sent over the network between the first computing device and the second computing device.
3. The method of clause 2, wherein: the first interaction includes a selection of a subset of the first set of values of the first metric that causes the subset to be visually represented differently in both the first graph and the second graph from the other values of the first set of values of the first metric.
4. The method of any of clauses 1-3, wherein: the first GUI includes at least three concurrently displayed graphs; the second GUI includes at least three concurrently displayed graphs including both the first graph and the second graph, and wherein: a first subset of the graphs displayed in the first GUI and the second GUI are visually synchronized to indicate interactions by both the first user and the second user in both the first GUI and the second GUI; and a second subset of the graphs of the first GUI and the second GUI are not visually synchronized, such that interactions by one of the first user and the second user are not indicated in both the first GUI and the second GUI.
5. The method of any of clauses 1-4, comprising: selecting graphs to display in collaborative sessions based on pairs of participants in the collaborative sessions.
6. The method of clause 5, wherein selecting graphs to display in collaborative sessions comprises: obtaining a log of previous sessions between a plurality of pairs of users, the log including a plurality of session records, at least some of the session records indicating that users interacted with a GUI during the respective session to add or modify a graph; accessing session records of sessions between the first user and the second user; determining, based on the accessed session records, that the second user adds a third graph to the second user's GUI in more than a threshold amount of sessions with the first user; determining, based on the accessed session records, that the first user does not add the third graph to the first user's GUI in more than a threshold amount of sessions with the second user; and in response to the determinations, selecting the third graph to display in the second GUI but not in the first GUI.

7. The method of clause 6, wherein selecting graphs to display in collaborative sessions comprises: accessing other session records in the log of sessions between a third user and the second user; determining, based on the other accessed session records, that the second user does not add the third graph to the second user's GUI in more than a threshold amount of sessions with the third user; and in response to the determination, determining to not select the third graph to display in a GUI presented to the second user in a session with the third user, wherein a collaborative session associated with instructing the first computing device to display the first GUI having the first graph is preceded by performing a configuration-preference learning process including both of: selecting the third graph to display in the second GUI but not the first GUI and not selecting the third graph to display in a GUI presented to the second user in a session with the third user; and determining to not select the third graph to display in a GUI presented to the second user in a session with the third user.

8. The method of any of clauses 1-7, comprising: selecting a first plurality of graphs for the first GUI based on a first role associated with the first user; selecting a second plurality of graphs for the second GUI based on a second role associated with the second user, wherein the first plurality is at least partially different from the second plurality of graphs, and wherein at least part of the first plurality is shared with the second plurality.

9. The method of clause 8, comprising: bidirectionally synchronizing, between the first GUI and the second GUI, at least part of displays of the part of the first plurality of graphs shared with the second plurality of graphs to indicate interactions by the first user with the first GUI on the second GUI and to indicate interactions by the second user with the second GUI on the first GUI.

10. The method of any of clauses 1-9, comprising: training a machine learning model to infer that the second user prefers to view the first metric in the second graph based on records of previous sessions including the second user and indicating modifications to a GUI made by the second user, wherein: instructing the second computing device to display in the second GUI the second graph comprises inputting an identifier of the second user into the trained machine learning model to output a result upon which the inference is based.

11. The method of clause 10, wherein: the trained machine learning model is configured to generalize from at least some previous sessions that are at least partially different from the current session with respect to inputs to the machine learning model to infer that the second user prefers to view the first metric in the second graph.

12. The method of clause 10, wherein training the machine learning model comprises: obtaining initial parameters of the machine learning model; and iteratively, until a termination condition is determined to have occurred: determining an aggregate amount of differences, or aggregate amount of agreement, between choices made by the second user in the records of previous sessions and inferences output by the machine learning model with current parameters; and adjusting the parameters of the machine learning model to reduce the aggregate amount of differences or increase the aggregate amount of agreement.

13. The method of any of clauses 1-12, comprising: assigning identifiers to values of the first metric, the identifiers distinguishing values of the first metric from one another in a shared computing session including the first user and the second user; defining a state of the first GUI and a state of the second GUI with reference to the identifiers; causing the state of the first GUI to change; and determining a subset of identifiers of values of the first metric affected by the state change; causing an update to the state of the second GUI implemented by communicating the subset of identifiers of values across a network and changing visual elements of the second GUI corresponding to the subset of identifiers of values, wherein changing the visual elements comprises determining that the visual elements represent metric values identified by members of the subset.

14. The method of any of clauses 1-13, comprising: assigning identifiers to values of a plurality of metrics displayed in the first GUI, the identifiers being within a name space that is different from a database schema of a database from which the values of the metrics are obtained.

15. The method of clause 14, comprising: storing the identifiers in a distributed hash table, the distributed hash table keeping some identifiers accessible to the first computing device private from the second computing device.

16. The method of clause 14, comprising: instructing the second computing device to display a third graph of a second metric, wherein the first computing device does not display a graph of the second metric while the second computing device displays the third graph; sharing identifiers the identifiers of values of the first metric between the first computing device and the second computing device; storing identifiers of values of the second metric in a portion of a data repository to which the first computing device does not have access; receiving a message to the first computing device from the second computing device including a given identifier of a given value of the second metric; determining that the first computing device does not have access to the given identifier of the given value of the second metric; determining that the second metric is a measurement based on values of the first metric based on a record indicating a plurality of metrics including the first metric are aggregated in the second metric; and in response to the determinations, accessing a value of the first metric in the shared storage to update the first GUI responsive to the message.

17. The method of clause 16, wherein: the message is a peer-to-peer message sent from the second computing device to the first computing device without passing through a server remote from both the first computing device and the second computing device.

18. The method of any of clauses 1-17, comprising: causing the first GUI or the second GUI to display an interface to access a resource in a workflow in response to a given graph or given metric being shared between the first user and the second user.

19. The method of any of clauses 1-18, comprising: training a machine learning model to infer at least a next step in the workflow based on a current state of the first GUI or the second GUI.

19. A tangible, non-transitory, machine-readable medium storing instructions that when executed by a data processing apparatus cause the data processing apparatus to perform operations comprising: the operations of any of clauses 1-19.

20. A system, comprising:
one or more processors; and
memory storing instructions that when executed by the processors cause the processors to effectuate operations comprising: the operations of any of clauses 1-19.

What is claimed is:

1. A tangible, non-transitory, machine readable medium storing instructions that when executed by one or more computers effectuate operations to provide a collaborative session between two analytics graphical user interfaces (GUI) presented on two different computing devices, the operations comprising:
   instructing a first computing device associated with a first user to display a first GUI having a first graph depicting a first set of values of a first metric;
   determining that the first graph is to be shared on a second computing device associated with a second user in a second GUI;
   inferring that the second user prefers to view the first metric in a second graph, different from the first graph, based on a record of previous interactions in which the second graph was selected to view the first metric; and
   in response to the inference and the determination, instructing the second computing device to display in the second GUI the second graph depicting at least some of the first set of values of the first metric, the first and second computing devices displaying the first and second graphs, respectively, concurrently.

2. The medium of claim 1, the operations comprising, while displaying the first and second graphs:
   receiving, via the first computing device, a first interaction by the first user with the first graph;
   instructing the second computing device to update the second graph in the second GUI to indicate the first interaction, wherein the second graph is updated based on a first message sent over a network between the first computing device and the second computing device;
   receiving, via the second computing device, a second interaction by the second user with the second graph; and
   instructing the first computing device to update the first graph in the first GUI to indicate the second interaction, wherein the first graph is updated based on a second message sent over the network between the first computing device and the second computing device.

3. The medium of claim 2, wherein:
   the first interaction includes a selection of a subset of the first set of values of the first metric that causes the subset to be visually represented differently in both the first graph and the second graph from the other values of the first set of values of the first metric.

4. The medium of claim 1, wherein:
   the first GUI includes at least three concurrently displayed graphs;
   the second GUI includes at least three concurrently displayed graphs including both the first graph and the second graph, and wherein:
      a first subset of the graphs displayed in the first GUI and the second GUI are visually synchronized to indicate interactions by both the first user and the second user in both the first GUI and the second GUI; and
      a second subset of the graphs of the first GUI and the second GUI are not visually synchronized, such that interactions by one of the first user and the second user are not indicated in both the first GUI and the second GUI.

5. The medium of claim 1, the operations comprising:
   selecting graphs to display in collaborative sessions based on pairs of participants in the collaborative sessions.

6. The medium of claim 5, wherein selecting graphs to display in collaborative sessions comprises:
   obtaining a log of previous sessions between a plurality of pairs of users, the log including a plurality of session records, at least some of the session records indicating that users interacted with a GUI during the respective session to add or modify a graph;
   accessing session records of sessions between the first user and the second user;
   determining, based on the accessed session records, that the second user adds a third graph to the second user's GUI in more than a threshold amount of sessions with the first user;
   determining, based on the accessed session records, that the first user does not add the third graph to the first user's GUI in more than a threshold amount of sessions with the second user; and
   in response to the determinations, selecting the third graph to display in the second GUI but not in the first GUI.

7. The medium of claim 6, wherein selecting graphs to display in collaborative sessions comprises:
   accessing other session records in the log of sessions between a third user and the second user;
   determining, based on the other accessed session records, that the second user does not add the third graph to the second user's GUI in more than a threshold amount of sessions with the third user; and
   in response to the determination, determining to not select the third graph to display in a GUI presented to the second user in a session with the third user,
   wherein a collaborative session associated with instructing the first computing device to display the first GUI having the first graph is preceded by performing a configuration-preference learning process including both of:
      selecting the third graph to display in the second GUI but not the first GUI and not selecting the third graph to display in a GUI presented to the second user in a session with the third user; and
      determining to not select the third graph to display in a GUI presented to the second user in a session with the third user.

8. The medium of claim 1, the operations comprising:
   selecting a first plurality of graphs for the first GUI based on a first role associated with the first user;
   selecting a second plurality of graphs for the second GUI based on a second role associated with the second user, wherein the first plurality is at least partially different from the second plurality of graphs, and wherein at least part of the first plurality is shared with the second plurality.

9. The medium of claim 8, the operations comprising:
   bidirectionally synchronizing, between the first GUI and the second GUI, at least part of displays of the part of the first plurality of graphs shared with the second plurality of graphs to indicate interactions by the first user with the first GUI on the second GUI and to indicate interactions by the second user with the second GUI on the first GUI.

10. The medium of claim 1, the operations comprising:
    training a machine learning model to infer that the second user prefers to view the first metric in the second graph based on records of previous sessions including the second user and indicating modifications to a GUI made by the second user, wherein:
       instructing the second computing device to display in the second GUI the second graph comprises inputting an identifier of the second user into the trained machine learning model to output a result upon which the inference is based.

11. The medium of claim 10, wherein:
the trained machine learning model is configured to generalize from at least some previous sessions that are at least partially different from the current session with respect to inputs to the machine learning model to infer that the second user prefers to view the first metric in the second graph.

12. The medium of claim 10, wherein training the machine learning model comprises:
obtaining initial parameters of the machine learning model; and
iteratively, until a termination condition is determined to have occurred:
determining an aggregate amount of differences, or aggregate amount of agreement, between choices made by the second user in the records of previous sessions and inferences output by the machine learning model with current parameters; and
adjusting the parameters of the machine learning model to reduce the aggregate amount of differences or increase the aggregate amount of agreement.

13. The medium of claim 1, the operations comprising:
assigning identifiers to values of the first metric, the identifiers distinguishing values of the first metric from one another in a shared computing session including the first user and the second user;
defining a state of the first GUI and a state of the second GUI with reference to the identifiers;
causing the state of the first GUI to change; and
determining a subset of identifiers of values of the first metric affected by the state change;
causing an update to the state of the second GUI implemented by communicating the subset of identifiers of values across a network and changing visual elements of the second GUI corresponding to the subset of identifiers of values, wherein changing the visual elements comprises determining that the visual elements represent metric values identified by members of the subset.

14. The medium of claim 1, the operations comprising:
assigning identifiers to values of a plurality of metrics displayed in the first GUI, the identifiers being within a name space that is different from a database schema of a database from which the values of the metrics are obtained.

15. The medium of claim 14, the operations comprising:
storing the identifiers in a distributed hash table, the distributed hash table keeping some identifiers accessible to the first computing device private from the second computing device.

16. The medium of claim 14, the operations comprising:
instructing the second computing device to display a third graph of a second metric, wherein the first computing device does not display a graph of the second metric while the second computing device displays the third graph;
sharing identifiers the identifiers of values of the first metric between the first computing device and the second computing device;
storing identifiers of values of the second metric in a portion of a data repository to which the first computing device does not have access;
receiving a message to the first computing device from the second computing device including a given identifier of a given value of the second metric;
determining that the first computing device does not have access to the given identifier of the given value of the second metric;
determining that the second metric is a measurement based on values of the first metric based on a record indicating a plurality of metrics including the first metric are aggregated in the second metric; and
in response to the determinations, accessing a value of the first metric in the shared storage to update the first GUI responsive to the message.

17. The medium of claim 16, wherein:
the message is a peer-to-peer message sent from the second computing device to the first computing device without passing through a server remote from both the first computing device and the second computing device.

18. The medium of claim 1, the operations comprising:
causing the first GUI or the second GUI to display an interface to access a resource in a workflow in response to a given graph or given metric being shared between the first user and the second user.

19. The medium of claim 1, the operations comprising:
training a machine learning model to infer at least a next step in a workflow based on a current state of the first GUI or the second GUI.

20. The medium of claim 1, the operations comprising:
obtaining a record indicating a problem with a third computing device, wherein:
instructing the first computing device to display the first graph includes selecting the first graph based on the record indicating the problem with the third computing device;
instructing the first computing device to display the first graph includes instructing the first computing device to display the first graph in a dashboard in the first GUI;
instructing the first computing device to display the first graph includes sending the first computing device a template from a fourth computing device; and
the template references metrics to be obtained from a fifth computing device different from the fourth computing device in order to populate the plurality of graphs with values of the metrics;
wherein:
a program executing on the first computing device, a program executing on a remote server configured to coordinate collaborative sessions between computing devices, or both perform:
instructing the first computing device to display the first GUI having the first graph, and
determining that the first graph is to be shared on the second computing device;
a program executing on the second computing device, a program executing on the remote server configured to coordinate collaborative sessions between computing devices, or both perform:
inferring that the second user prefers to view the first metric in a second graph, and
instructing the second computing device to display the second graph;
determining that the first graph is to be shared on the second computing device comprises receiving a request from the first user to initiate a collaborative session with the second user in which portions of dashboards in the first GUI and the second GUI are shared, inferring that the second user prefers to view the first metric in the second graph comprises accessing a probabilistic model to personalize the second GUI based on previous sessions including the second user, both the first graph and the second graph are displayed in the second GUI;

a third graph is displayed in the second GUI based on the probabilistic model associating the third graph with the first metric for the second user, the first GUI or the second GUI displays a workflow inferred from a present context of the session based on past sessions, and interactions by the first user and the second user with the first graph and the second graph, respectively, are synchronized by passing messages between the first computing device and the second computing device without exchanging video, wherein the messages include unique identifiers of values of the first metric to which the interactions relate, the unique identifiers being defined by an identifier namespace of a collaborative computing session including the first user and the second user.

21. A method, comprising:

instructing, with one or more processors, a first computing device associated with a first user to display a first GUI having a first graph depicting a first set of values of a first metric;

determining, with one or more processors, that the first graph is to be shared on a second computing device associated with a second user in a second GUI;

inferring, with one or more processors, that the second user prefers to view the first metric in a second graph, different from the first graph, based on a record of previous interactions in which the second graph was selected to view the first metric; and in response to the inference and the determination, instructing, with one or more processors, the second computing device to display in the second GUI the second graph depicting at least some of the first set of values of the first metric, the first and second computing devices displaying the first and second graphs, respectively, concurrently.

22. The method of claim 21, comprising, while displaying the first and second graphs:

receiving, via the first computing device, a first interaction by the first user with the first graph;

instructing the second computing device to update the second graph in the second GUI to indicate the first interaction, wherein the second graph is updated based on a first message sent over a network between the first computing device and the second computing device;

receiving, via the second computing device, a second interaction by the second user with the second graph; and instructing the first computing device to update the first graph in the first GUI to indicate the second interaction, wherein the first graph is updated based on a second message sent over the network between the first computing device and the second computing device.

23. The method of claim 21, comprising:

selecting graphs to display in collaborative sessions based on pairs of participants in the collaborative sessions.

24. The method of claim 21, comprising:

assigning identifiers to values of a plurality of metrics displayed in the first GUI, the identifiers being within a name space that is different from a database schema of a database from which the values of the metrics are obtained.

25. The method of claim 21, comprising:

training a machine learning model to infer at least a next step in a workflow based on a current state of the first GUI or the second GUI.

* * * * *